United States Patent [19]

Hamada et al.

[11] Patent Number: 4,783,677
[45] Date of Patent: Nov. 8, 1988

[54] AUTOMATIC FOCUS CONTROL DEVICE

[75] Inventors: Masataka Hamada, Osaka; Kenji Ishibashi, Sakai; Tokuji Ishida, Daito, all of Japan

[73] Assignee: Minolta Camera Kabushiki Kaisha, Osaka, Japan

[21] Appl. No.: 65,047

[22] Filed: Jun. 22, 1987

[30] Foreign Application Priority Data

Jun. 21, 1986 [JP] Japan .................................. 61-145474
Jun. 23, 1986 [JP] Japan .................................. 61-147686
Jun. 23, 1986 [JP] Japan .................................. 61-147687
Jun. 25, 1986 [JP] Japan .................................. 61-150480

[51] Int. Cl.$^4$ .......................... G03B 3/00; G03B 7/08
[52] U.S. Cl. ..................................... 354/402; 354/430
[58] Field of Search ............... 354/400, 402, 406, 430

[56] References Cited

U.S. PATENT DOCUMENTS

| 3,820,129 | 6/1974 | Hosoe et al. . | |
|---|---|---|---|
| 4,462,671 | 7/1984 | Suzuki et al. | 354/430 |
| 4,545,665 | 10/1985 | Aihara . | |
| 4,664,495 | 5/1987 | Alyfuku et al. | 354/430 |
| 4,673,276 | 6/1987 | Yoshida et al. | 354/430 |
| 4,709,138 | 11/1987 | Suda et al. | 354/430 |
| 4,733,264 | 3/1988 | Hatase et al. | 354/430 |

FOREIGN PATENT DOCUMENTS 60-214325 10/1985 Japan .

Primary Examiner—Russell E. Adams
Attorney, Agent, or Firm—Burns, Doane, Swecker & Mathis

[57] ABSTRACT

An automatic focus control device for use in a camera in which a defocus condition of the lens of the camera is detected by estimating the defocus value by detecting the motion of the photographic object.

25 Claims, 27 Drawing Sheets

Fig. 8
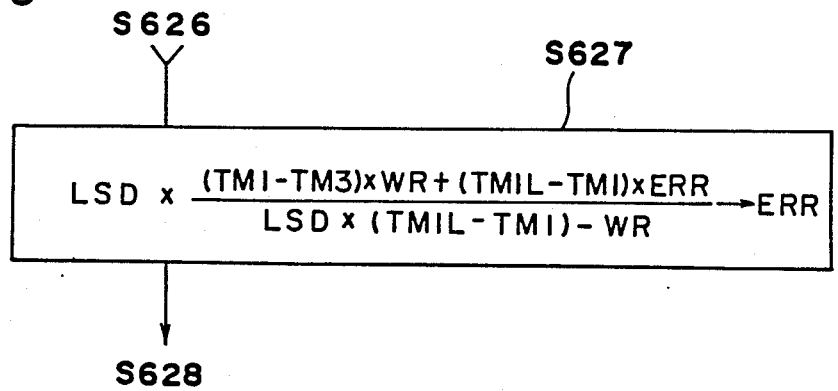
Fig. 9
Fig. 10
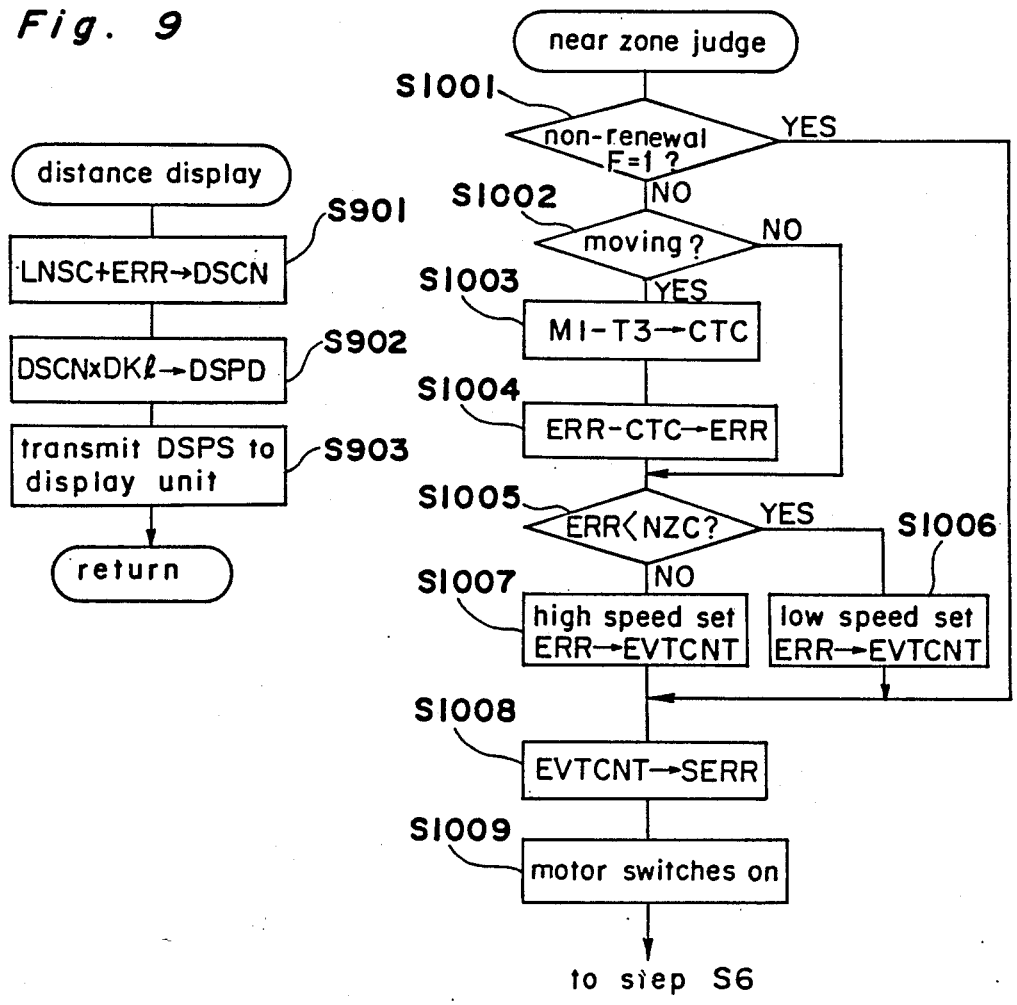

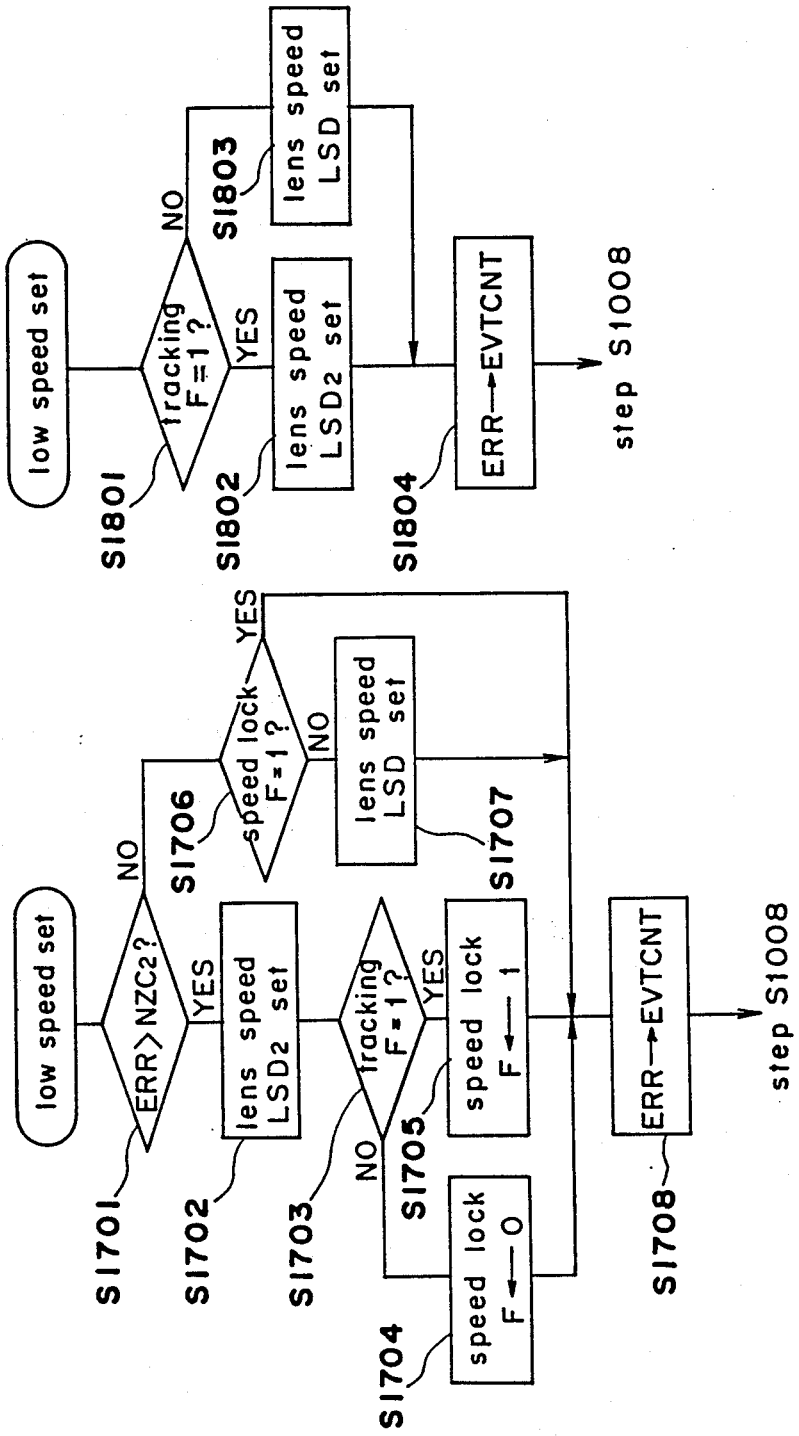

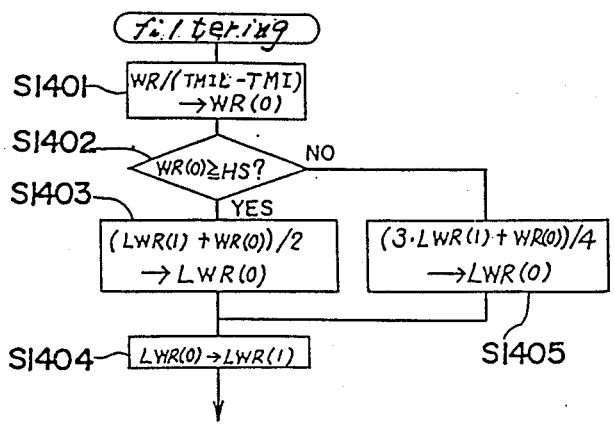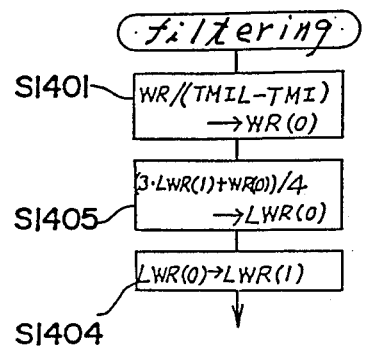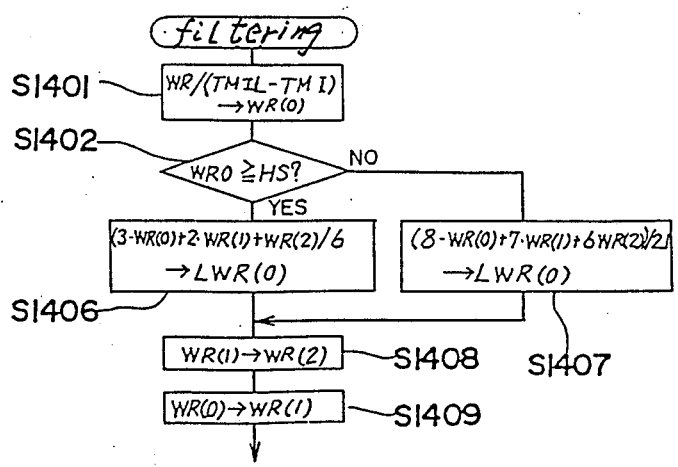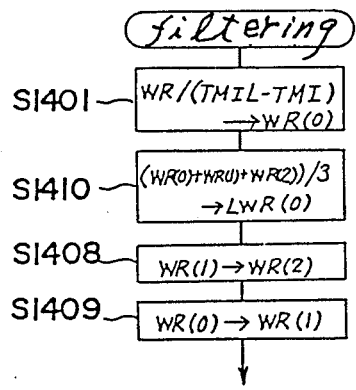

AUTOMATIC FOCUS CONTROL DEVICE

BACKGROUND OF THE INVENTION

1. <Background of the Invention>

The present invention relates to an automatic focus control device for a camera, and particularly to an automatic focus control device which enables focus control while photographing a moving object.

2. <Description of the Prior Art>

A camera comprising an automatic focus (referred to as AF hereinafter) control device is so constructed that an integration of a light receiving element is executed for focus detection and the data generated from the receiving light element is converted from analogue to digital (referred to as A/D hereinafter) and inputted to a microcomputer in which the defocus amount of a photographic lens calculated. Then, the photographic lens is moved to the in-focus position on the basis of the calculation value for focus detection. Therefore, it takes a predetermined time for the photographic lens to reach the in-focus condition from the beginning of the calculation for focus detection, resulting in a time lag. If the defocus amount of the photographic lens of the camera for the object is changed due to the movement of the object during the time lag, the photographic lens which has finished the movement during the time lag tends to be out-of-focus for the object.

Therefore, it is necessary to enable the AF control to permit photographing a moving object. For example, according to the AF control shown in Japanese Patent Laid Opened No. 214325/1985, the position of the photographic lens is compensated in real time by repeating the calculation of the focus detection and by driving control of the photographic lens. In this case, however, the above mentioned control operation is only explained on the condition after the in-focus position for the object is once predetermined. In other words, the above mentioned operation is controlled on the premise condition that the photographic lens is set in the in-focus position for the object which is stopping or moving slowly first, subsequently the photographic lens is moved trackingly in order to obtain the in-focus condition for the moving object. However, there is no description of the way in the prior art how the in-focus condition can be obtained for the object moving in a high speed from the first.

SUMMARY OF THE INVENTION

An essential object of the present invention is to provide an automatic focus control device for use in a camera in which a photographic lens can be positioned in an in-focus position even if a photographic object is moving at a relatively rapid speed.

Another object of the present invention is to provide at automatic focus control device for use in a camera inwhich an in-focus condition of the photographic lens can be preliminarily estimated so that the photographic lens is positioned in an in-focus condition correctly.

According to the present invention, there is provided an automatic focus control device for use in a camera comprising:

measuring means for measuring the position of a photographic object with reference to the camera;

first calculation means for calculating a lens defocus value by the measurement value of the measuring means;

judging means for judging whether or not the photographic object is a moving body on the basis of the result of the calculation performed by the first calculation means;

second calculation means for calculating an estimated defocus value of the photographic lens at the time the second calculation is finished.

These and other features and objects of the present present invention will be apparent from the descripton of the preferred embodiments described herein in conjunction with the attached drawings.

BRIEF EXPLANATION OF THE DRAWINGS

FIG. 17 is a flowchart showing the control operation of the second example according to the present invention, FIG. 18 is a flowchart showing the control operation of a third example according to the present invention, FIGS. 36 to 39 are flowcharts showing further embodiments of the present invention.

DETAILED DESCRIPTION OF THE PREFERRED EMBODIMENT

Detailed description of the preferred embodiment according to the present invention will be explained with reference to the drawings as follows.

Figure 1:
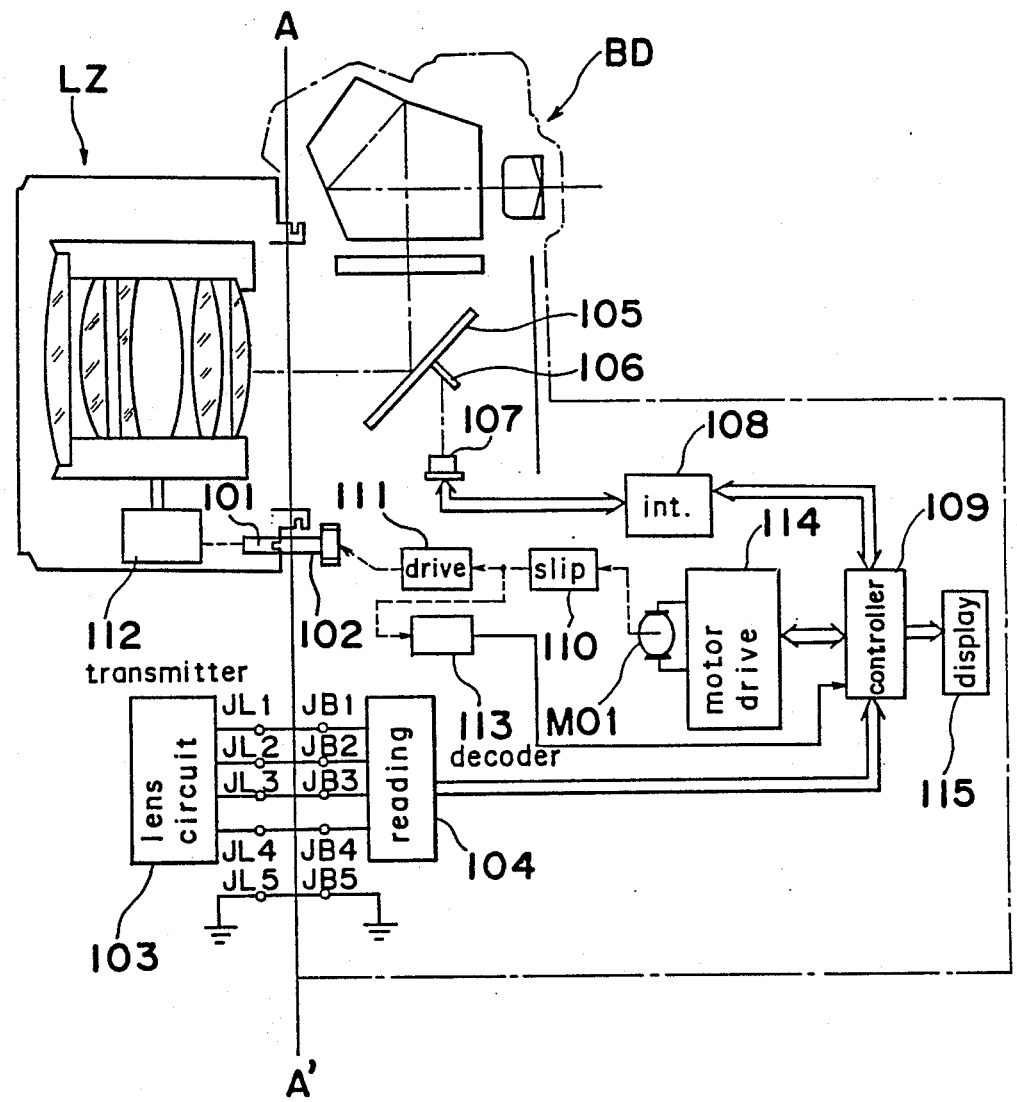
FIG. 1 is a block diagram showing a first example of a camera employing an automatic focus control device according to the present invention.

FIG. 1 shows a block diagram of a camera, wherein the left side portion with respect to the line A—A' in FIG. 1 shows an interchangeable lens LZ and the right side with respect to the line A—A' shows a camera body BD. Both of the two portions, the interchangeable lens LZ and the camera body BD, are constructed so as to be combined each other through clutches 101 and 102. When the interchangeable lens LZ is mounted to the camera body BD by the clutches 101 and 102, a lens circuit 103 in the side of the interchangeable lens LZ and a reading circuit 104 in the side of the camera body BD are electrically connected through connection terminals JL1 to JL5 of the lens circuit 103 and terminals JB1 to JB5 of the reading circuit 104.

In this camera system, the optical system is so constructed that the the light from the object to be photographed having passed through the lens system of the interchangeable lens LZ passes through the semi-transparent portion in the center of a reflection mirror 105 and is reflected by a sub mirror 106 and then received in the charge coupled device (referred to as CCD hereinafter) image sensor 107 in a focus detection module. The CCD image sensor 107 is used as a focus detection means for measuring the defocus amount for the object, a known arrangement in which a plurality of light electricity conversion elements are arranged in an array shape so that the signal from each of the light electricity conversion elements is taken out, can be employed.

The operations of an interface circuit 108 are to drive the CCD image sensor 107, to receive the object data from the CCD image sensor 107 and to send out the received data to a controller 109. The controller 109, based on the received data, calculates and generates signals corresponding to the defocus amount $|\Delta|$ showing the deviation amount from the in-focus position of the photographic lens and the defocus direction showing whether the position of the photographic lens is deviated forward or backward.

A motor MO1 is driven on the basis of the above mentioned data signals and the revolution of the motor MO1 is transmitted to a transmitting device 112 through a slip device 110, driving device 111 and the clutches 102 and 101, whereby the focus control is executed by moving the lens system of the interchangeable lens LZ in the direction of the optical axis of the photographic lens. In this case, an encoder 113 is connected to the driving device 111 in the camera body BD and the number of pulses corresponding to the movement amount of the lens system are generated from the encoder 113.

The slip device 110 is arranged in order to slip the revolution of the motor MO1 when a torque which is larger than the predetermined value is applied to the moving portion of the interchangeable lens LZ, preventing the motor MO1 from being applied by an additive load.

The clock pulses for synchronizing when transmitting data and reading starting signal for starting the reading of the data signal are transmitted from the reading circuit 104 inside the camera body BD to the lens circuit 103 inside the interchangeable lens respectively through the terminals JB1–JL1, JB2–JL2 and JB3–JL3. The serial data is transmitted from the lens circuit 103 to the reading circuit 104 through the terminals JL4–JB4. Both of the terminals JB5–JL5 are connected to the ground.

First, when the reading starting signal is transmitted from the reading circuit 104 to the lens circuit 103, the data in the lens circuit 103 are serially transmitted synchronized with the clock pulses to the reading circuit 104 through the terminals JL4–JB4. The reading circuit 104 converts the input serial data into parallel data on the basis of the clock pulses which are the same as the clock pulses transmitted to the lens circuit 103 and the converted parallel data are transmitted from the reading circuit 104 to the controller 109. One of the transmitted data is a conversion factor K representing the relationship between unit revolution member of the motor MO1 and the movement amount of the lens driven by the motor MO1.

The controller 109 calculates the defocus amount $|\Delta|$ depending on the data of the object image transmitted from the interface cicuit 108 and the conversion factor K transmitted from the reading circuit 104 and calculates the pulse number N to be detected in the encoder 113 by the calculation $K \cdot |\Delta|$. Moreover, the controller 109 rotates the motor MO1 in the right or left rotation direction through the motor driver circuit 114 depending on the signal showing the defocus direction obtained based on the object image data, and when the pulses of the same pulse number N as the above mentioned calculated pulse number are inputted from the encoder 113 into the controller 109, it is judged that the lens system for AF control (automatic focus) is moved as much as the movement amount $\Delta d$ to the in-focus position and then stops the rotation of the motor MO1.

According to the above mentioned focus control, when the lens system is set in the in-focus position, a predetermined signal is transmitted from the controller 109 to the display circuit 115, so that the in-focus display and the display of the distance to the object from the camera are executed.

Figure 2:
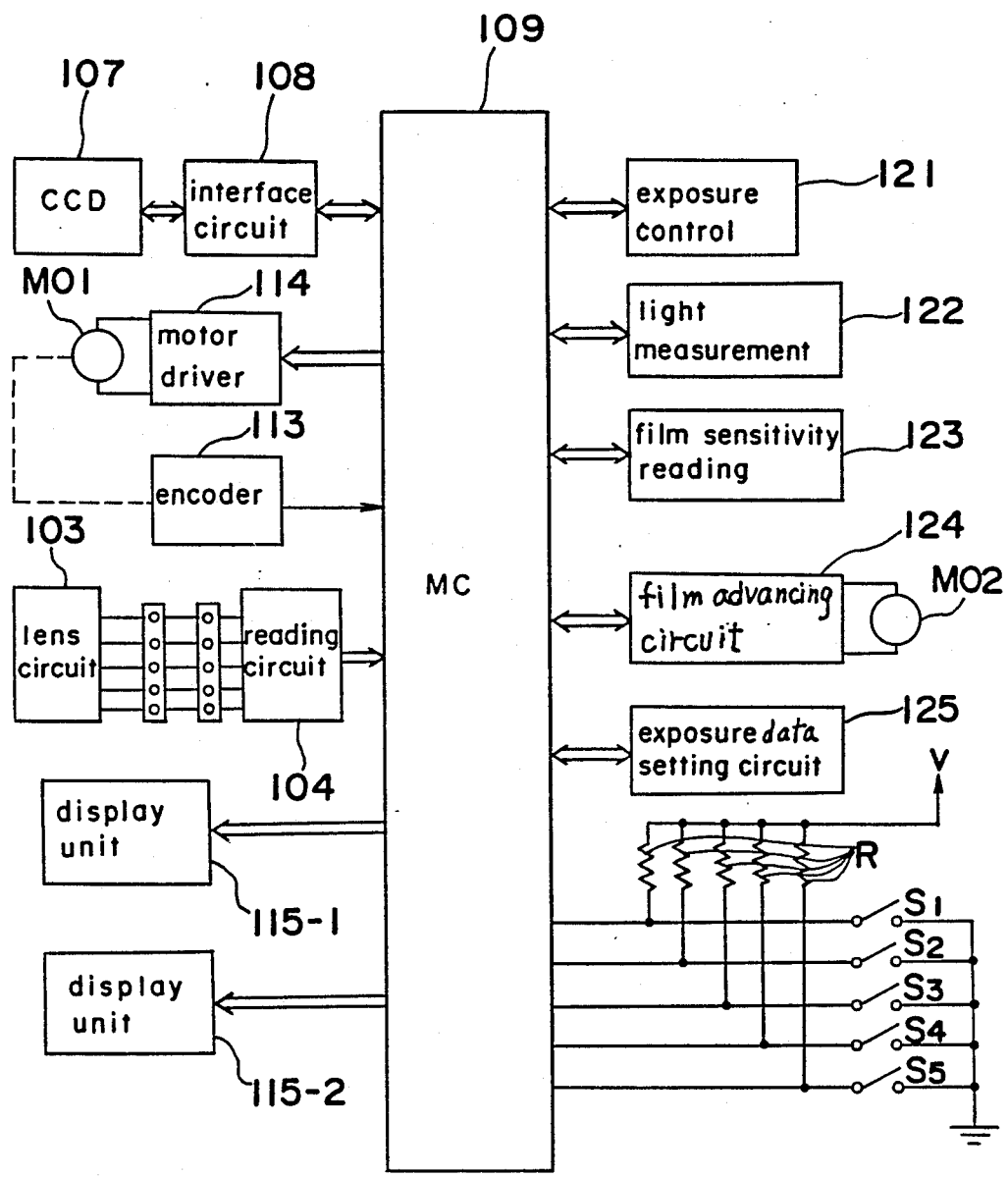
FIG. 2 is a block diagram showing the control device in FIG. 1, FIGS. 3 to 13 are flowcharts showing the control operation in FIG. 1, FIGS. 14 and 15 are graphs for explaining the control operation simply.

The summary of the camera operation is explained as described above, and next the control operation of the controller 109 will be described in details with reference to FIG. 2. Reference marks in FIG. 2 represent the portions similar to the portions in FIG. 1.

Reference numeral 109 denotes a microcomputer operating the above mentioned controller 109 in FIG. 1, reference numeral 121 denotes an exposure control circuit which opens and closes the camera shutter in response to the starting and finishing of the exposure and raises up the reflection mirror 105 and executes the diaphragm control in response to the mirror-up signal. Reference numeral 122 denotes a light measurement circuit which converts a light measurement signal corresponding to the brightness of the object into a digital form and transmits the converted digital signal to the microcomputer 109. Reference numeral 123 denotes a film sensitivity automatic reading circuit for reading the sensitivity of a film enclosed in the camera, wherein the read film sensitivity is applied to the microcomputer 109. Reference numeral 124 denotes a film advance circuit for advancing one frame of a film in the camera by driving the motor MO2 depending on the signal transmitted from the microcomputer 109. Reference numeral 125 denotes an exposure data setting circuit for setting the shutter speed or the diaphragm value and the set values are applied to the microcomputer 109.

Data pertaining to the image of the object from the CCD image sensor 107 are transmitted to the microcomputer 109 through the interface circuit 108. Reference numerals 115-1 and 115-2 denote the display circuits for displaying the focus detection condition and the distance to the object from the camera respectively.

Reference mark $S_1$ denotes a switch which is turned on in the first step of pressing a release button (not shown), and the microcomputer 109 starts the operation in the AF flow mentioned below are executed by turning the switch $S_1$ on. Reference mark $S_2$ denotes a switch which is turned on in the second step of pressing the release button, and the operation of the release flow mentioned below is executed by turning the switch $S_2$ on. Reference mark $S_3$ denotes a switch which is turned on at the time of the mirror-up completion of the reflection mirror and is turned off when the shutter release member (not shown) is charged. Reference mark $S_4$ denotes a film advance mode switch for switching the continuous advance mode and the one frame advance mode. Reference mark $S_5$ denotes a switch which is turned on at the time of the exposure completion and is turned off at the time of the completion of winding one frame of the film. One of each of the switches $S_1$ to $S_5$ is connected to the ground and the other side which is connected to the microcomputer 109 is respectively pulled up to the power V through the resistors R.

Next, the control operation of the camera constructed as described above will be explained with reference to flowcharts shown in FIGS. 3 to 13.

Figure 3:
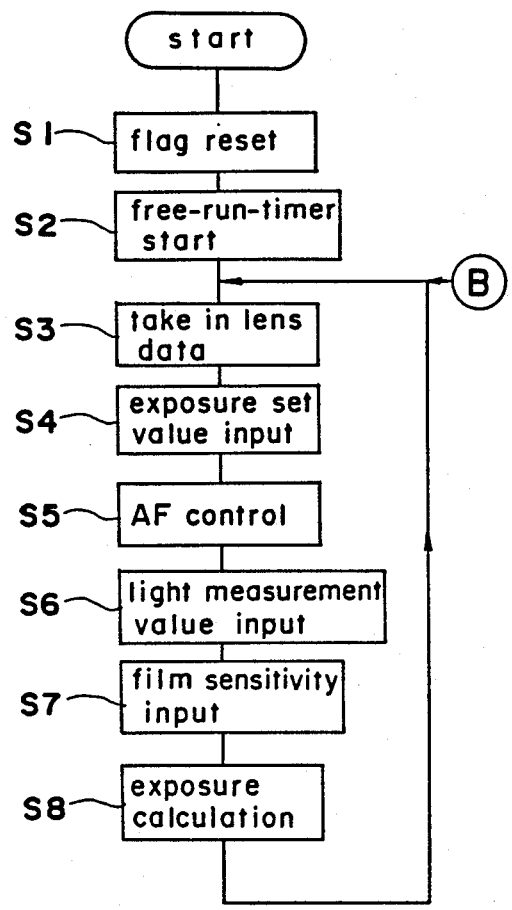

When the switch $S_1$ is turned on in the first step of pressing the shutter release button, the microcomputer 109 executes the flow in FIG. 3.

First, various kinds of flags are reset in the step $S_1$ and a free-run timer in the microcomputer 109 is started in the step $S_2$ in order to obtain the time at each operation. In the step S3 the lens data necessary for the AF control such as focal length and the full open aperture value of the photographic lens, the conversion factor K, and conversion factor Dk1 for converting the lens movement amount into the actual distance are applied to the microcomputer 109 from the lens circuit 103 through the reading circuit 104.

In the step S4, set diaphragm value or set shutter speed are applied to the microcomputer 109 from the exposure data setting circuit 125, and in the next step S5 the focus detection calculation and the AF control by which the photographic lens is moved to the in-focus position on the basis of the value of the focus detection calculation, are executed as described below. In the step S6 the light measurement value is applied to the microcomputer 109 from the light measurement circuit 122, and in the step S7 the film sensitivity is applied to the microcomputer 109 from the film sensitivity reading circuit 123. In the step S8 after the exposure calculation for the exposure control is executed depending on the above mentioned input data, the program goes back to the step S3 and repeats the loop operation.

Figure 4:
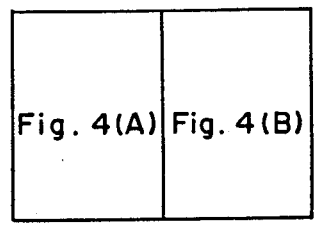
Figure 4A:
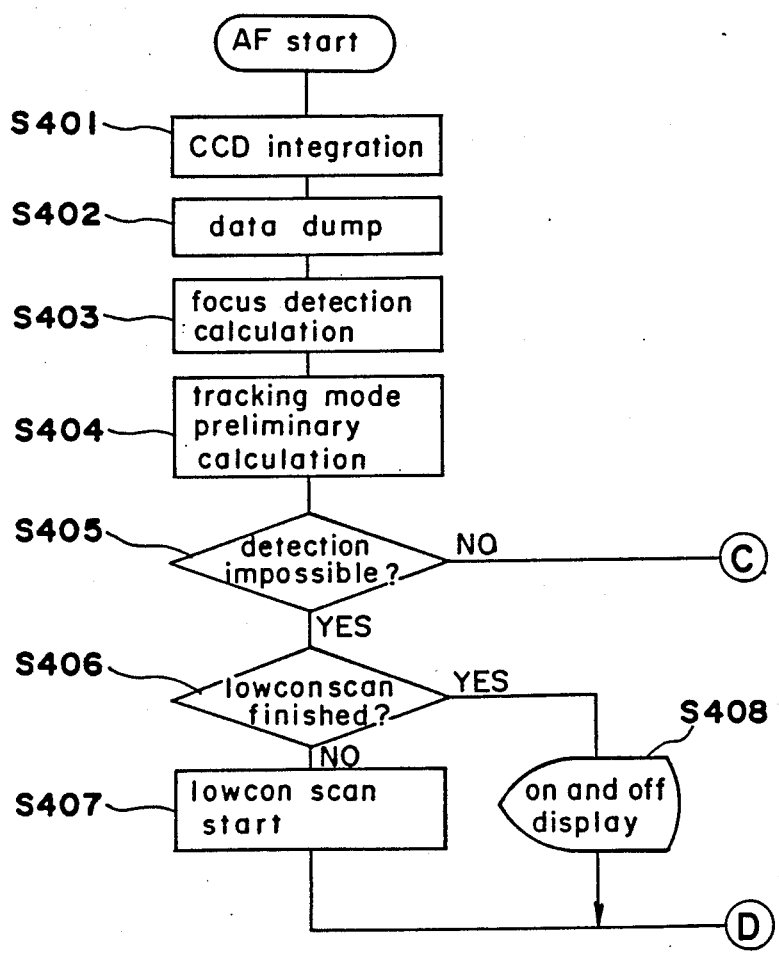
Figure 4B:
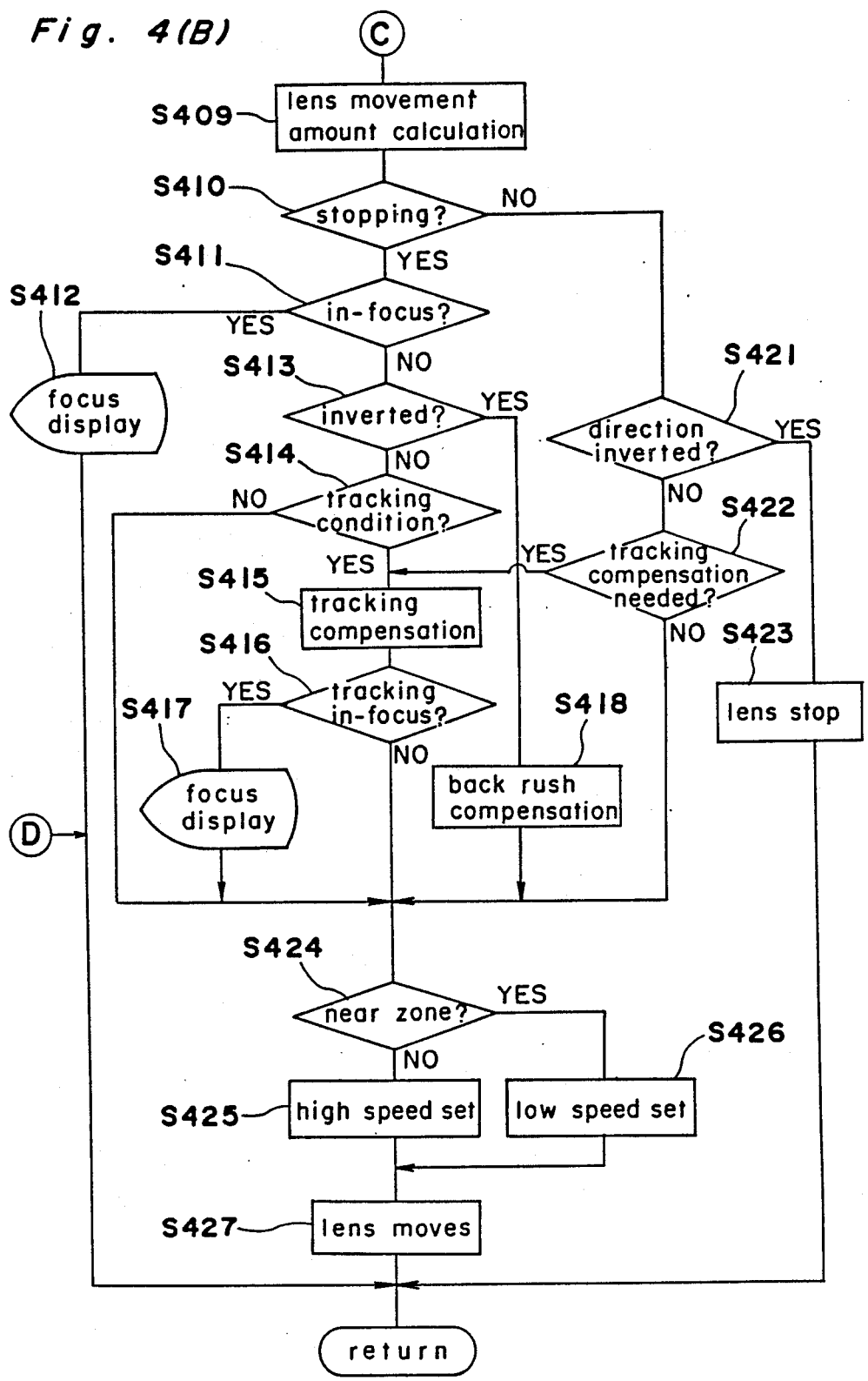

FIG. 4 shows the routine of the AF control in the step S5.

First in the step S401 the object light is integrated by the CCD image sensor 107. In the next step S402 the object data integrated by the CCD image sensor 107 is taken out in every image elements (this operation is called data dump) and after the object data is A/D converted by the interface circuit 108, the converted object data is applied to the microcomputer 109 from the interface circuit 108. In the step S403 the focus detection calculation is executed on the basis of the above mentioned object data. The detailed explanations of the optical system for the focus detection and the focus detection calculation are omitted because they are not essential portions of the present invention and are described in detail in Japanese Patent Laid Opened No. 126517/1984.

In the step S404 a preliminary calculation for the tracking compensation is executed. In the step S405 the defocus amount and the defocus direction are calculated depending on the object data transmitted from the CCD image sensor 107 and it is judged from the result of the calculation whether the detection of the defocus amount is possible or not. In case the object image is greatly blurred or low contrast, it is judged that the detection of the defocus amount is impossible and the program goes to the step S406.

In case of impossibility of the focus detection, it is judged in the step S406 whether the operation of moving the photographic lens for searching the focus detectable portion (referred to as Lowcon Scan hereinafter) is finished or not. In case the Lowcon Scan is not executed, the Lowcon Scan is started in the step S407. In case the focus detection is still impossible when the Lowcon Scan is finished, a display going on and off which shows that the focus detection is impossible is activated in the display circuit 115-1 in the step S408, subsequently the program returns to the step S6 in FIG. 3.

On the other hand, in case it is judged that the detection of the defocus amount is possible in the step S405, the program goes to the step S409 to calculate the lens movement amount ERR (pulse count unit) from the detected defocus amount DF and the movement conversion factor K which is one of the lens data applied to the microcomputer 109 from the lens circuit 103 in the step S3 in FIG. 3.

ERR=DF X K

In the step S 410 it is judged whether the photographic lens is stopping or not, and in case of stopping of the photographic lens it is judged in the step S411 whether or not the photographic lens is set in the in-focus condition. In case of the in-focus position, the in-focus display is executed at the display circuit 115-1 in the step S412, subsequently the program returns to the flow in FIG. 3 and goes to the step S6.

On the other hand, in case the out-of-focus condition in the step S411, the program goes to the step S413 and it is judged whether or not the defocus direction obtained by the execution of the present routine is opposite to the defocus direction obtained by the execution of the last routine. If the present defocus direction is inverted from the last defocus direction, the back rush amount of the lens driving system which causes an error at the time of inverting the lens movement is compensated in the step S418 and then the program goes to the step S424. If the above mentioned two defocus directions are same in the step S413, the program goes to the step S414 and it is judged whether or not the AF driving mode for the tracking compensation described below is needed, and in case of the tracking compensation mode the lens movement amount is compensated as a tracking compensation in the step S415.

In the step S416 it is judged whether the in-focus condition taking into consideration of the tracking compensation mode is detected or not, and in case of the in-focus condition the in-focus display is executed in the step S417, subsequently the program goes to the step S424.

On the other hand, in case the photographic lens is moving in the step S410, the program goes to the step S421 and the defocus direction is compared with the last defocus direction, and in case it is judged the present defocus direction is inverted from the last defocus direction, after the lens driving is stopped in the step S423, the program returns. If the focus detection calculation is executed during the movement of the photographic lens in spite of the inverted defocus direction, the reliability of the value of the focus detection is lowered. That is the reason why the photographic lens is stopped in the step S423. In case the defocus direction is not inverted, the program goes to the step S422 and it is judged whether the tracking compensation similar to that in the step S414 is necessary or not, and in case the tracking compensation is needed, the program goes to the step S415 but in case the tracking compensation is not needed, the program goes to the step S424.

In the step S424 it is judged by the calculated defocus amount whether the photographic lens is disposed near the in-focus position (near zone). In case the photographic lens is not disposed in the near zone, the photographic lens is set so as to be moved in a high speed in the step S425. In case the photographic lens is set in the near zone, the photographic lens is set so as to be moved in a low speed in the step S426. In the step S427 the photographic lens is moved in the set driving speed, subsequently the program returns and the focus calculation is executed below the step S6.

Figure 5:
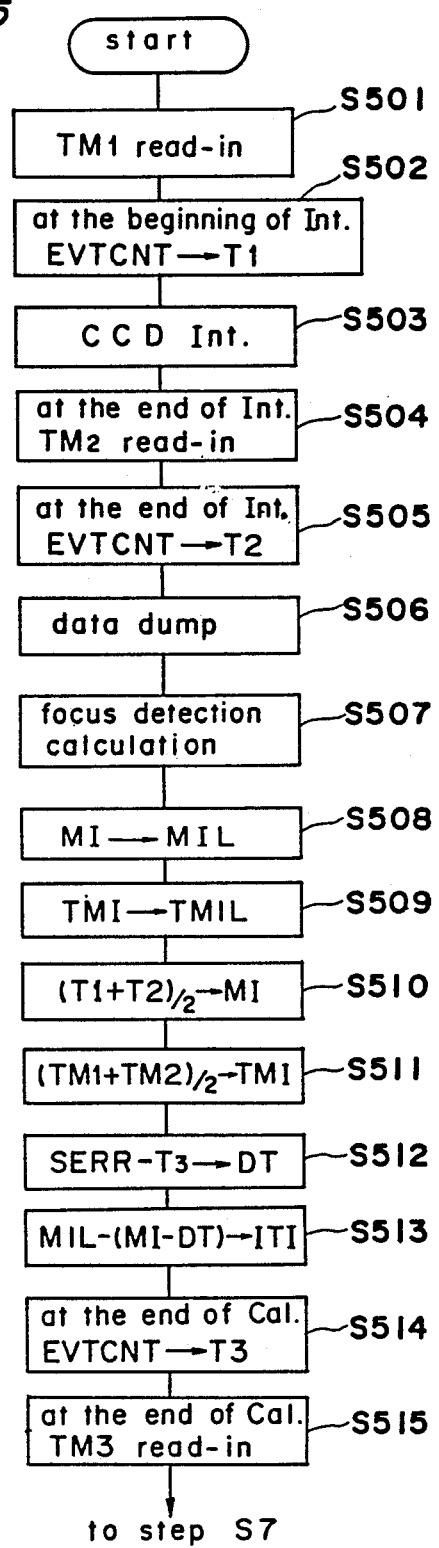

FIG. 5 is a flowchart showing the further detailed explanation of the tracking compensation in the steps S3 to S6 in FIG. 3. In the step S501 the time TM1 of the free-run timer at the beginning of the integration of the CCD image sensor 107 is read, and in the step S502 the count value T1 of the event counter EVTCNT is read for the control of the lens movement amount at the beginning of the integration. In the step S503 the integration of the CCD image sensor 107 is executed. In the step S504 the integration ending time TM2 of the CCD image sensor 107 is read from the free-run timer, and in the step S505 the count value T2 of the event counter EVTCNT at this time is read. Subsequently in the steps S506 and S507 the data dump of the CCD image sensor 107 and the calculation of the focus detection are executed as described above. The needed time for executing the routine is almost spent for the operation in the steps S501 to S507. As described below, the count value MI of the event counter EVTCNT at the center point of the integration, during the execution of the AF routine, is memorized in the register R, and in the step S508 the event count value MI stored in the register R is mmmorized as the value MIL in the register R' for storing the last calculation value. In the step S509 similar to the step S508, the time TMI at the center point of the integration is memorized as the value TMIL in the register for memorizing the last calculation value. In the step S510 the count value $(T1+T2)/2$ at the integration center point is calculated from the count values T1 at the beginning of the integration and T2 at the end of the integration of the event counter EVTCNT obtained by the execution of the present routine and the count value $(T1+T2)/2$ is memorized as a new value MI in the register R. In the step S511 similar to the step S510, the time $(TM1+TM2)/2$ at the integration center point is calculated from the times TM1 and TM2 at the beginning and ending of the integration and is memorized in the corresponding register.

In the next step S512 the lens movement amount of the lens moved from the last integration center to the present integration center is calculated, which is explained with reference to FIG. 14.

Figure 14:
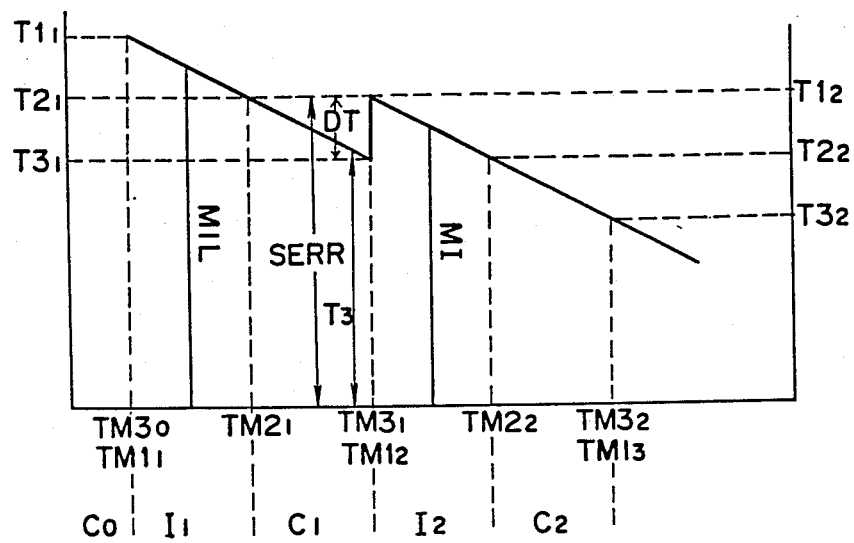

In FIG. 14 the horizontal axis represents the time and the vertical axis represents the count value of the event counter EVTCNT. Reference numerals $T1_1$ and $T1_2$ represent the count values of the event counter EVTCNT at the starting times $TM1_1$ and $TM1_2$ in the integrations periods $I_1$ and $I_2$ respectively and numerals $T2_1$ and $T2_2$ represents the count values of the event counter EVTCNT at the ending times $TM2_1$ and $TM2_2$ in the integration periods $I_1$ and $I_2$ respectively and numerals $T3_1$ and $T3_2$ respectively represent the count values of the event counter EVTCNT at the ending times $TM3_1$ and $TM3_2$ in the calculation periods $C_1$ and $C_2$ which are followed by the integration periods $I_1$ and $I_2$ respectively. The values MIL and MI respectively represent the count values of the integration centers obtained from the count values $T1_1$ and $T2_1$, $T1_2$ and $T2_2$, wherein the relation between the times $TM3_1$ and $TM1_2$ is shown as follows:

$$TM3_1 = TM1_2$$

The values of the event counter EVTCNT, which are memorized in the registers R and R', are respectively rewritten or renewed at the end of the corresponding calculations, the event count value MI is memorized in the register R as the count value $T3_2$ of the event counter EVTCNT at the end time $TM3_2$ of the calculation period $C_2$ and the event count value MIL obtained by the last calculation period $C_1$ is memorized in the register R'. The event count values MI and MIL represent the plus numbers to be counted in the encoder which are converted from the defocus amount obtained by the respective calculation periods and correspond to the defocus amounts from the object image planes at the center points of the integration periods respectively. As shown in FIG. 14, however, there occurs a discontinuity in the event count value at the end time of the calculation period $C_1$ and the start time of the next integration period $I_2$. This discontinuity represents the focus detection error because the event count value is rewritten at the time $TM3_1$ by the focus detection result during the integration period I. Therefore, the value (MIL−MI) does not represent the correct movement amount of the photographic lens during one period of the integration. Assuming that the gap of the discontinuous event value is DT, the value DT is obtained by the subtraction (SERR−T3), wherein the value SERR represents the set value of the calculation result as the movement amount of the photographic lens in the encoder at the end of the calculation period $C_1$ and the value $T3(=T3_1)$ represents the count value of the event counter EVTCNT showing the lens position at this time. Therefore, the movement amount ITI of the photographic lens in one period of the focus detection is obtained by subtracting the value (MI−DT) from the value MIL as follows:

$$ITI = MIL - (MI - DT)$$

After the values DT and ITI are calculated in the steps S512 and S513, the count value T3 of the event counter EVTCNT at the end of the present calculation period is read in the step S514. In the next step S515 the end time TM3 of the calculation period is read and then the program goes to the step S7 in FIG. 3.

Figure 6:
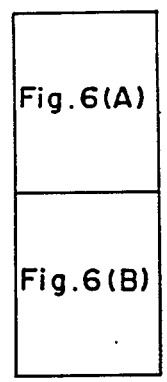
Figure 6:
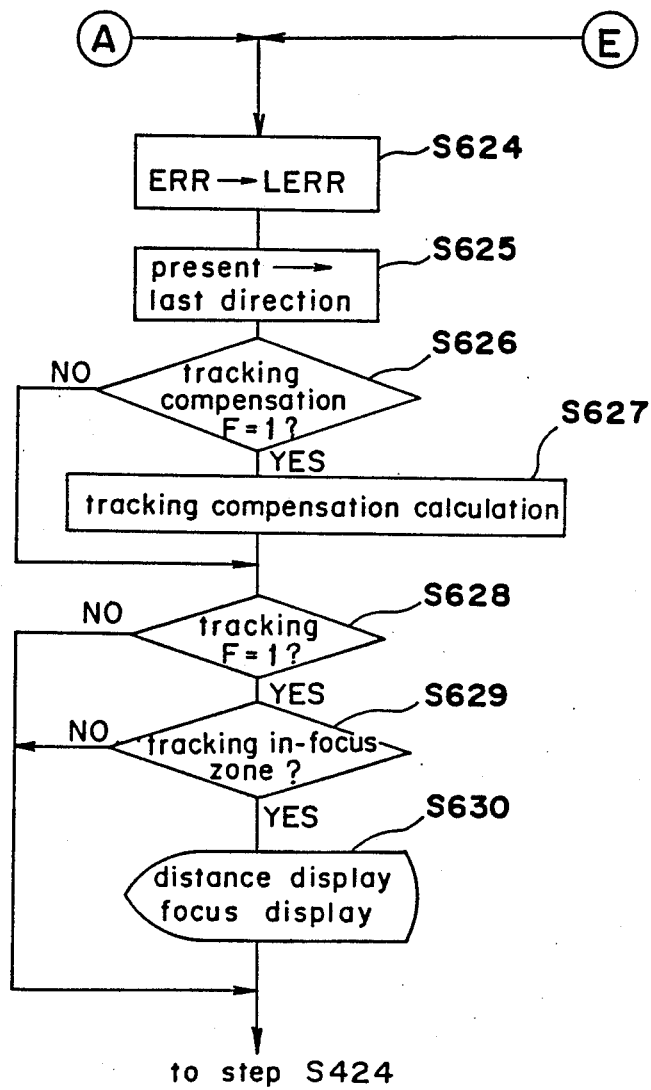
Figure 7:
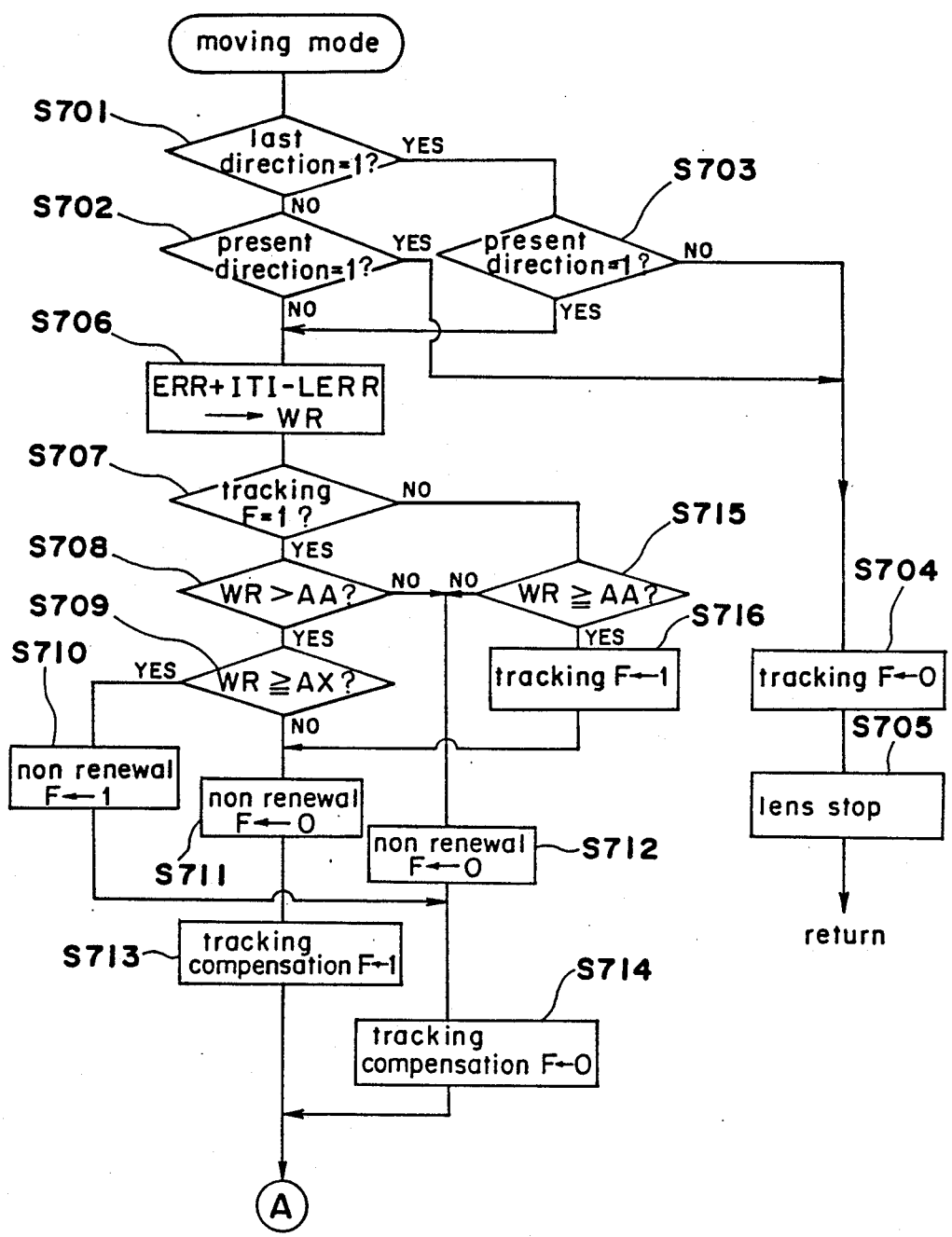

FIGS. 6 and 7 are flowcharts describing the flow in detail after judging whether the photographic lens is stopped or moving in the step S410.

FIG. 6 is a flowchart in case the photographic lens is stopped and the operation in this mode is executed for the purpose of executing this flow first, confirming in-focus condition, or executing after attainment of in-focus condition. In the step S601 it is judged whether the photographic lens is positioned in the predetermined focus zone at the present time. If the photographic lens is positioned in the in-focus zone, the program goes to the step S602 and the present movement amount ERR of the photographic lens is set as the last movement amount LERR of the photographic lens in order to be used at the time of the next compensation, and in the same way the lens movement set value EVTCNT is set as the value SERR. In the step S603 the present defocus direction is rewritten instead of the last defocus direction in the similar manner, and in the step S604 as described below, the in-focus display and the display of the distance to the object from the camera are executed in the display circuit 115-2 (as described in details below), subsequently the program returns to the step S6 in FIG. 3 and the focus detection is repeated again.

On the other hand, if it is judged in the step S601 the photographic lens is out-of-focus zone, the program goes to the step S605 and it is judged whether the execution of the corresponding flow is first or not, and in case of the first execution the program goes to the step S606 and the tracking flag is reset. The tracking flag is used for judging whether or not the program is to be entered the flow of the tracking mode where the compensation is executed in order to improve the tracking ability of the focus detection. In the step S607 a non-renewal flag for preventing the renewal of the count value of the event counter EVTCNT is reset. In the next step S608 a tracking compensation flag for compensating the calculation result one after another obtained in the tracking mode is reset to be 0.

In the second execution, the program goes to the steps S610, S611 and S612 from the step S605 and the defocus direction at the present calculation is compared with the defocus direction at the last calculation value. In case the present defocus direction is inverted from the last defocus direction, the back-rush of the lens driving system is compensated in the step S613, subsequently the program goes to the step S606 and a tracking flag is reset as an initialization. This means that the program gets rid of the tracking mode in case the tracking mode is not set. On the other hand, in case the present defocus direction is same as the last defocus direction, the program goes to the step S614 and the movement amount of the object is calculated. The manner of calculation of the movement amount of the object is explained with reference to FIG. 15.

Figure 15:
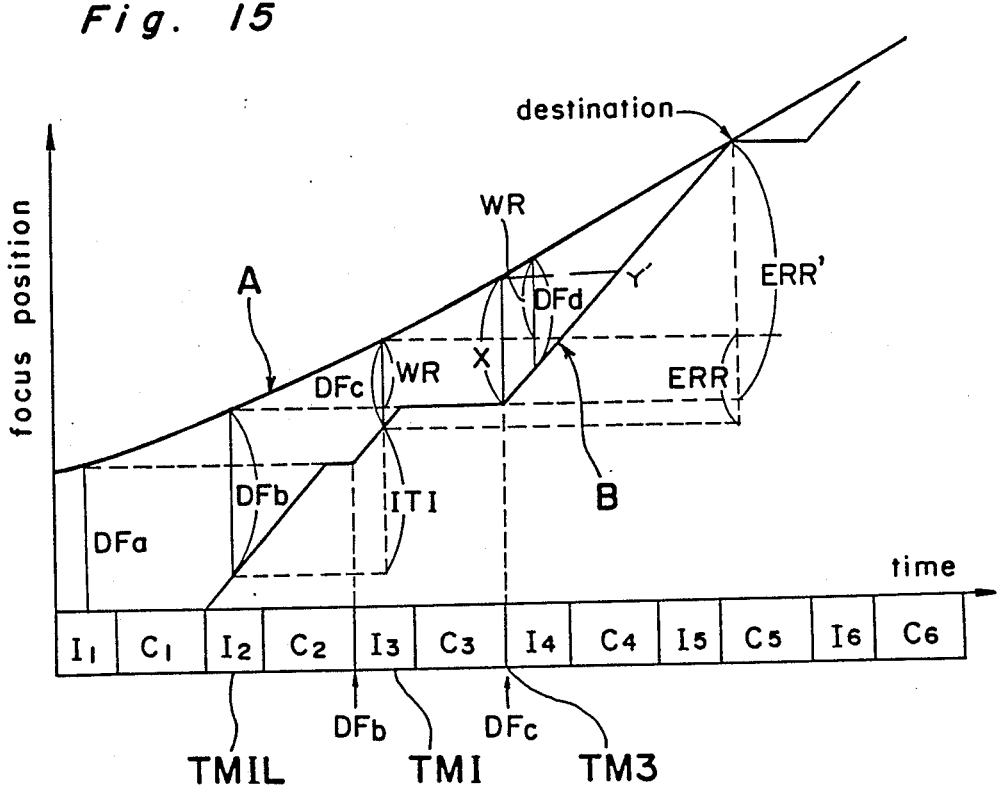

In FIG. 15 the vertical axis represents the focus position of the photographic lens and the horizontal axis represents the time. The line A denotes the movement of the moving object, the line B denotes the movement of the photographic lens driven to track the object, wherein the distance between the object and the photographic lens at the same time represents the defocus amount. Assuming that the present time is at the time TM3 of ending the calculation $C_3$ and the movement amount WR of the object in one period from the center point TMIL of the last integration $I_2$ to the center point TMI of the present integration $I_3$ has been already obtained and also the defocus amount DFc at the center point TMI of the integration $I_3$ has been already obtained. At the times TMIL and TMI the converted values of the photographic lens movement become LERR at the last time and ERR at the present time respectively. The defocus amount WR produced by the movement of the object in one period between the center point TMIL of the integration $I_2$ and the center point TMI of the integration $I_3$ is obtained with reference to FIG. 15 as follows;

$$WR = ERR + ITI - LERR$$

The value ITI represents the movement amount of the photographic lens from the time TMIL to the time TMI.

In the next step S615 the condition of the tracking flag is judged. Referring to the operation according to the flow, as described above, since the tracking flag is reset by the first execution of the flow, the program goes to the step S616 from the step S615 at this time. In this step S616 it is judged whether or not the movement amount WR of the object is more than a predetermined value AB indicative of the area which can be regarded as an in-focus zone without a tracking compensation in consideration of the difference of the calculation results and the width of the in-focus zone. The value AB may be changed corresponding to the focus detection time of one period. That is, since the one period of the movement of the object is changed depending on the integration time, the value AB may be represented as follows:

$$AB = AB_0 \times (TMIL - TMI)$$

wherein the value $AB_0$ is constant and the value (TMIL−TMI) obtained in the steps S508 and S510 in FIG. 5 is the one period time from the integration center to the next integration center. Since the value WR/(TMIL−TMI) represents the inclination of the movement of the object, the value of the denominator (TMIL−TMI) is included in the value AB.

In the step S616 in case the movement amount WR of the object is less than the value AB, the program goes to the step S607, but in case the movement amount WR is equal to or more than the value AB, the tracking flag is set 1 in the step S617 and then the program goes to the step S607.

In this case when in the next execution of the flow, since the tracking mode is set by setting the tracking flag, the program goes to the step S618 through the steps S601, S614 and S615. In the step S618 as well as in the step S616 the movement amount WR of the object is compared with the value AB, and in case the movement amount WR of the object is less than the value AB, the tracking compensation is not executed but the program goes to the step S607. In case the movement amount WR of the object is equal to or more than the value AB, the program goes to the step S619. In the step S619 the movement amount WR of the object is compared with the other predetermined value AX which is much larger than the value AB, and in case the movement amount WR is less than the value AX, the non-renewal flag is reset in the step S621 and the tracking compensation flag is set in the step S622.

On the other hand, in case the movement amount WR of the object is equal to or more than the value AX, the non-renewal flag is set in the step S623, subsequently the program goes to the step S608 and the tracking compensation flag is reset. The operations of this flow are executed when the movement amount WR of the object are greatly changed by changing the direction of the camera in the tracking mode, and in this case the count value of the event counter EVTCNT is not renewed to retain the last count value and the AF control is executed by using the last count value of the event counter EVTCNT so that the tracking compensation is inhibited. At the next execution of the flow, since the greatly changed value is replaced as the lens movement amount LERR in the execution of the next flow, if the direction of the camera is kept changed, the movement amount WR of the object is not greatly changed at this time, therefore the program goes to the steps S621 and S622 the non-renewal flag is reset and the tracking compensation flag is set.

As described above, when the defocus amount is greatly changed, the calculation result is ignored one time and the AF control is executed by using the last data. Subsequently, in case the direction of the camera is retained to be changed, the mvement amount WR of the object becomes to be less than the value AX and the program goes to the step S621, whereby the AF control is executed with the greatly changed movement amount LERR of the photographic lens.

The program goes to the step S624 after the operation in the step S608 or S622, and the present lens movement amount ERR is set as the last lens movement amount LERR, and the present defocus direction is set as the last defocus direction in the step S625. In the step S626 it is judged whether the tracking compensation flag is set 1 or not, and in case the tracking compensation flag is set 1, the calculation of the tracking compensation is executed in the step S627 as described in details below and the lens movement amount ERR is compensated. Therefore, in the step S624 the lens movement amount ERR which is not compensated by tracking is memorized as the last lens movement amount LERR. In case the tracking flag is set 1 in the step S628, it is judged in the step S629 whether or not the photographic lens is positioned in the tracking in-focus zone, and in case the photographic lens is in the tracking in-focus zone, the in-focus display and the distance display are executed in the step S630, subsequently the program goes to the step S424 in FIG. 4. On the other hand, in case the tracking flag is reset in the step S628 or the photographic lens is positioned out of the tracking in-focus zone in the step S629, the program goes directly to the step S424. The above mentioned tracking in-focus zone indicates the area which may not be included in the in-focus zone at the end of the present calculation but becomes to be included in the in-focus zone in the future timing due to the tracking compensation operation, and in this case the focus display is executed even if the photographic lens is moving.

FIG. 8 shows in details the calculation of the tracking compensation in the step S627. The manner compensation is explained with reference to FIG. 15.

Assuming that the present time is at the time TM3 of ending the calculation $C_3$ and as described above, the movement amount WR of the object in one period between the center point TMIL of the last integration $I_2$ and the center point TMI of the present integration $I_3$ has been obtained and also the defocus amount $DF_c$ at the center point TMI of the integration $I_3$ has been obtained. However, at this time TM3 the object has already moved from the time TMI when the defocus amount $DF_c$ is obtained, subsequently the object moves still more during the driving of the photographic lens after the time TM3. Even though the movement delay amount WR of the object in one period of the object caused by the movement of the object is compensated, the photographic lens is stopped during the calculation $C_4$ but the object is moving after the lens stopping until the time TM3' when the next calculation result is obtained so as to cause the tracking delay. The tracking delay is shown by an intersection point Y' of the movement line of the photographic lens with the defocus amount X which is the defocus amount DFC added by the value WR as shown in FIG. 15. Therefore, if the compensation is executed toward the point where the movement of the in-focus position of the photographic lens will catch up the movement of the object in consideration of the tracking delay during the lens driving, the stopping of the lens driving is prevented by incorrect judging that the movement of the in-focus position of the photographic lens catches up the movement of the object during the time lag caused by the integration and the calculation, so that the tracking ability of the photographic lens for the object can be retained.

Therefore, the relative movement amount of the object until the movement of the focus position of the photographic lens catches up the movement of the object has to be compensated based on the basic position of the center point TMI of the integration $I_3$.

Assuming that the movement amount of the object from the time TMIL to the time TMI is WR, the inclination 'a' representing the movement speed of the object in this period is represented as follows;

$$a = \frac{WR}{TMIL - TMI}$$

and the lens driving speed 'b' at the present time is represented as follows assuming that b=LSD and X is the defocus amount at the time TM3:

$$X = a \times (TMI - TM3) + ERR$$
$$= \frac{(TMI - TM3)}{(TMIL - TMI)} \times WR + ERR$$

wherein

ERR is the value that the defocus amount DFc measured at the time TMI is converted into the lens driving amount, that is, the value of the compensated lens movement amount till the time TM3 when the calculation result is obtained. The necessary time t for the lens movement to catch up the object movement is represented as follows:

$$t = \frac{X}{B - A}$$

Hence, in this period the lens driving amount ERR' is represented as follows:

$$ERR' = b \times t = LSD \times \frac{X}{B - A}$$
$$= LSD \times \frac{(TMI - TM3)WR + (TMIL - TMI)ERR}{LSD(TMIL - TMI) - WR}$$

The value ERR' is used as the compensated movement amount ERR of the photographic lens as shown in the step S627. Thus, the destination time when the lens movement catches up the object movement is predetermined and the lens movement is controlled to reach the destination time at the end of the lens driving.

In this case, though the description is about the case when the movement of the in-focus position of the photographic lens catches up the movement of the moving object, also in case the object is drawing near to the movement direction of the photographic lens, a control similar to that described above can be adopted.

The defocus amount DF to be calculated in the present embodiment is represented as follows:

$$DF = DF1 + DF2 - ITI$$
$$= DF1 + (v_1 - v_2)t$$

wherein

DF1: the defocus amount of the photographic lens at the center point of the integration which is executed before the calculation of the focus detection, DF2: the movement amount of the object on the focal plane of the photographic lens from the integration center point to the end of the calculation of the focus detection, ITI: the movement amount of the photographic lens on the focal plane of the photographic lens from the integration center point to the end of the calculation of the focus detection, $v_1$: the movement speed of the object, $v_2$: the movement speed of the photographic lens, t: the time from the integration center point to the end of the calculation of the focus detection.

FIG. 9 shows the display routine in the steps S604 and S630 in FIG. 6.

In the present embodiment the pulse transmitted fromthe encoder is counted up at the time of shifting the photographic lens forward and is counted down at the time of shifting the photographic lens backward, whereby the pulse count value corresponding to the shift amount of the photographic lens is obtained and the pulse count value is stored in a lens shift absolute amount counter LNSC.

In the step S901 the addition value of the lens shift amount count value of the counter LNSC obtained as mentioned above and the lens movement amount ERR is set in the distance counter DSCN. The count value of the counter LNSC is set 0 when the focus position of the photographic lens is situated in the position corresponding to ∞ and is counted up in proportion to the lens shift amount. Therefore, the count value corresponding to the distance to the object is inputted to the distance counter DSCN. In the step S902 the count value of the distance counter DSCN is multiplied with the distance conversion data Dk1 peculiar to the photographic lens applied from the lens, and the multiplied result is converted into the data "display parameter DSPD". The display parameter DSPD, which is not the distance data, is transmitted to the display device, whereby it becomes to be the distance display data and then the distance display is executed in the step S903.

Going back to FIG. 4, in case it is judged in the step S410 that the photographic lens is moving, the operation in this case is described in details with reference to FIG. 7.

In the steps S701 to S703 the last defocus direction is compared with the present defocus direction and in case the present defocus direction is inverted from the last defocus direction, the program goes to the step S704 and the tracking flag is reset. This means that since the movement of the in-focus position of the photographic lens catches up the movement of the object and passes the in-focus position for the object in the tracking operation, the tracking mode is canceled. In the next step S705 the driving of the photographic lens is stopped, and then the program returns to the step S6 in FIG. 3 to repeat the focus detection. On the other hand, in case the present defocus direction lens is the same as the last defocus direction, the program goes to the step S706 and as described before the movement amount WR of the object is calculated as follows:

$$WR = ERR + ITI - LERR$$

In the next step S707 it is judged whether the tracking mode is set or not by judging the condition of the tracking flag, and in case the tracking mode is set, the program goes to the steps S708 to S714, wherein the operation is similar to that of the steps beginning from S618 in the stopping mode in FIG. 6, therefore the explanation of this portion is omitted. On the other hand, in case the tracking mode is not set in the step S707, the program goes to the step S715 and it is judged whether or not the movement defocus amount WR of the object is equal to or larger than the predetermined value AA which is slightly less than the predetermined value AB, and in case the movement defocus amount wR is less than the value AA, the program goes to the steps S712 and S714 and the non-renewal flag and the tracking compensation flag are reset. On the other hand, in case the movement defocus amount WR of the object is equal to or more than the predetermined value AA, the tracking flag is set 1 in the step S716, subsequently the non-renewal flag is reset in the step S711 and the tracking compensation flag is set in the step 713. The operation in this portion is different from the case of the lens stopping mode and since the high speed control is needed in the lens moving mode, the tracking compensation flag is set in order to be compensated by tracking immediately.

The reason why the value AB which is compared with the movement defocus amount WR at the time of lens stopping, is different from the value AA which is compared with the movement defocus amount WR at the time of lens moving (AA<AB) when the movement of the object is detected from the movement defocus amount WR of the object, is described as follows. The values AB and AA are within the range that the tracking compensation is not needed considering the differences of the calculation results and the width of the in-focus zone. In other words, the larger the values AA and AB, the more difficult the tracking compensation becomes. The value AB at the time of the lens stopping is made large because the calculation results at the time of the lens stopping are changed after focusing by some conditions (such as low brightness causing the S/N to be low) and when tracking compensation is executed in missing, the defocus amount is compensated (the value WR is increased) more than the difference and the lens position is shifted from the in-focus position under such conditions, the lens shifting condition is seen by the photographer and may cause an apprehension that the focus detection device is not functioning properly.

In case the object is moving when the lens is moving to the in-focus zone, it is desirable that the lens is settled in the in-focus zone quickly by tracking compensation of the lens. However, in case the value is made small, the occurrence of the uncorrected tracking compensation becomes higher than in case of the lens stopping. The photographer does not become apprehensive because the lens is moving (the foucs control is being executed).

The above mentioned differences of the calculation results occur when the object condition is not good, but seldom occur in general. Therefore, it would be better that, the tracking compensation is easily executed while the lens is moving so that the photographer is apprehensive as he might be in the case is compensation after the lens has stopped.

After the operation in the steps S713 and S714, the program goes to the step S624 in FIG. 6.

FIG. 10 is a detailed explanation of the steps S424 to S427 in FIG. 4.

In the step S1001 it is judged whether the non-renewal flag is set 1 or not, and in case the non-renewal flag is reset, the program goes to the step S1002 and it is judged whether the photographic lens is moving or not, and in case the photographic lens is moving, the lens movement amount CTC (=MI−T3) from the time of receiving the object data to the end of the calculation is calculated in the step S1003 and the lens movement amount ERR is compensated in the step S1004. That is, the lens movement amount ERR is subtracted from the lens movement amount CTC which becomes to be the count error between the time of applying the data and the time of obtaining the result of the calculation, and then the program goes to the step S1005. In case the photographic lens is not moving, the operations of the steps S1002 and S1003 are skipped.

In the step S1005 it is judged whether or not the lens driving count value ERR is within the near zone NZC, and in case the count value ERR is within the near zone NZC, the lens driving speed is set low in order to raise up the focus precision and the lens driving count value ERR newly obtained is set in the event counter EVTCNT in the step S1006. On the other hand, in the step S1005 in case the lens driving count value ERR is equal to or larger than the near zone NZC, the lens driving speed is set high and the lens driving count value ERR is set in the event counter EVTCNT in the step S1007. In the step S1008 the count value of the event counter EVTCNT is set as the lens driving amount SERR for the offset calculation of the next event count. In the step S1009 the AF driving motor is switched on, and then the program returns to the step S6 in FIG. 3.

Figure 11:
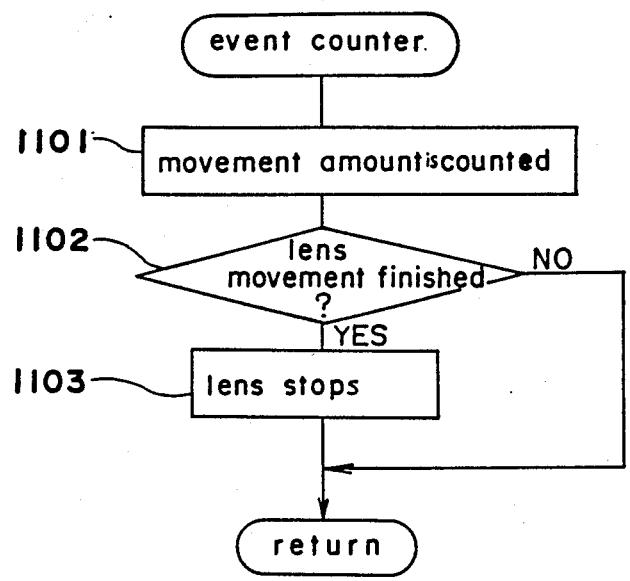

FIG. 11 shows the interruption routine for controlling the lens driving amount and this interruption routine is executed whenever the pulse is generated from the encoder owing to the revolution of the AF motor MO1.

In the step S1101 the event count value showing the lens movement amount is subtracted by 1. In the step S1102 it is judged whether or not the event count value becomes 0 to complete the movement of the photographic lens as much as the determined movement amount, and when the event count value becomes 0, the AF motor is stopped in the step S1103 and then the program returns. After returning, in case the calculation result in stopping of the AF motor is within the in-focus zone, the focus display is executed.

Figure 12:
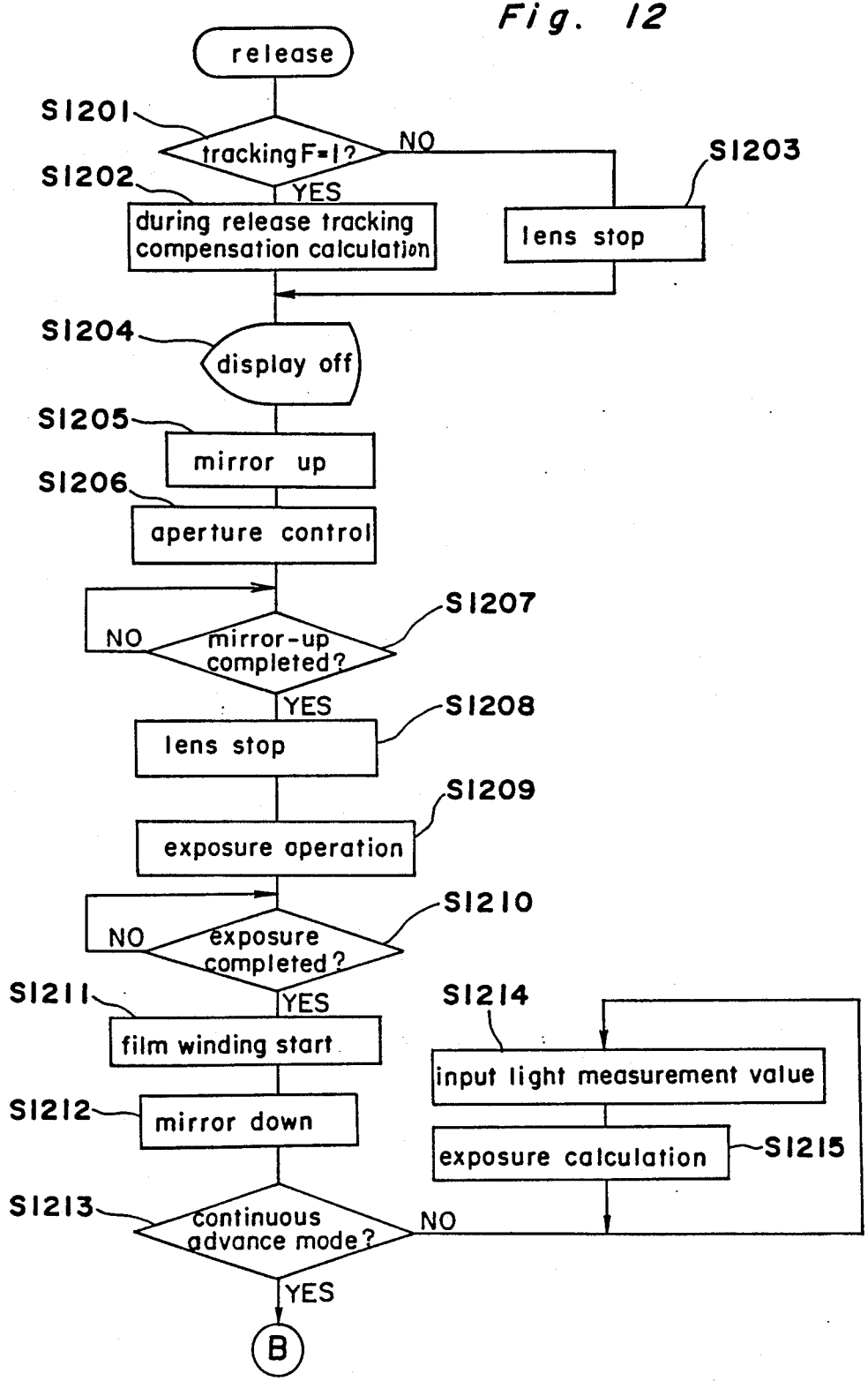

FIG. 12 shows an interruption routine which occurs when the switch $S_2$ is turned on by depressing the shutter release button during the execution of the AF routine shown in FIG. 3.

In the step S1201 it is judged whether the tracking mode is set 1 or not, and in case the tracking flag is set, the tracking compensation of the lens movement amount is calculated in the step S1202 and the photographic lens is driven on the basis of the compensation result till the starting of the exposure. The above mentioned tracking compensation corresponding to the movement amount of the object during the release time lag from the time of receiving the release signal to the time of starting the exposure is executed for the count value of the event counter EVTCNT.

In case the tracking compensation is reset in the step S1201, the lens driving is stopped in the step S1203. The reason why the photographic lens is stopped is that the lens driving is controlled in a low speed because the photographic lens is comparatively close to the in-focus position for the object in the tracking mode, the lens driving may be controlled in a high speed in the ordinary mode (not in the tracking mode), and in this case it takes a little time for the photographic lens to be completely stopped in response to the lens stopping signal so that the delay of the extent of the release time lag in maximum is occurred.

The tracking compensation calculation during the shutter release in the step S1202 is explained with reference to FIG. 13.

In the step S1301 the reference value RT is the time of the release time lag peculiar to the camera and is a constant value. The value WR/(TMIL−TMI) is the defocus amount corresponding to the movement of the object per a unit time, therefore the value WR/(TMIL−TMI)×RT represents the tracking delay amount in the release time lag and is used as the movement defocus amount WR of the object. In the step S1302 the count value of the event counter EVTCNT, is compensated by adding the above mentioned obtained defocus amount WR to the count value.

Going back to FIG. 12, the display showing the in-focus condition is turned off in the step S1204. Subsequently in the step S1205 raising-up of the reflection mirror 105 is started and in the next step S1206 the aperture control is executed through the exposure control circuit 121. In the step S1207 it is judged whether or not the raising-up of the reflection mirror 105 is completed, and in case of the completion of raising up the reflection mirror 105, the program goes to the step S1208 and the lens driving is stopped. Thus, the lens driving is continued in the tracking mode until the raising of the reflection mirror 105 is completed, in other words, till the exposure is started. In the step S1209 the exposure is started and in the next step S1210 it is judged by the condition of the switch $S_5$ whether the exposure is completed or not. In case of the completion of the exposure, the automatic film advance in the camera is started in the step S1211 and subsequently in the step S1212 the reflection mirror 105 is pulled down. In the step S1213 it is judged by the condition of the switch $S_4$ whether the continuous film advance mode is set or not, and in case the continuous film advance mode is set, the program goes back to the step S3 in FIG. 3 and the similar control is executed. On the other hand, in case the one frame film advance mode is set, the program goes to the loop for repeating only the light measurement in the steps S1214 for the input of the light measurement value and S1215 for the exposure calculation and waits the next shutter release operation or turning off of the switch $S_1$.

As described above, since the compensation is executed projecting toward time point when the movement of the in-focus position of the photographic lens will catch up the movement of the object in consideration of the tracking delay needed for the lens driving because the object is moving during the movement of the photographic lens, the desired in-focus condition of the photographic lens can be obtained in a short time.

Next, a second example according to the present invention will be explained with reference to FIGS. 16 and 17. In the second example, the photographic lens driving is controlled by switching two different kinds of the lens driving speed in stead by using a constant lens driving speed in the first example of the present invention as mentioned above. In the second example, the lens driving speed is switched to low or high speed according to the movement amount of the photographic lens necessary for reaching the in-focus position of the photographic lens, in case the rest lens movement amount is larger than the predetermined value in the near zone, the lens driving speed becomes LSD, and in case the rest lens movement amount is below the predetermined value, the lens driving speed becomes LSD2 which is higher than the lens driving speed LSD. In this case, since the switching of the lens driving speed is controlled independently of the tracking mode, in case the lens driving speed becomes LSD2 in the tracking mode, the photographic lens is moved in the high driving speed LSD2 until the movement of the in-focus position of the photographic lens catches up the movement of the object.

Figure 16:
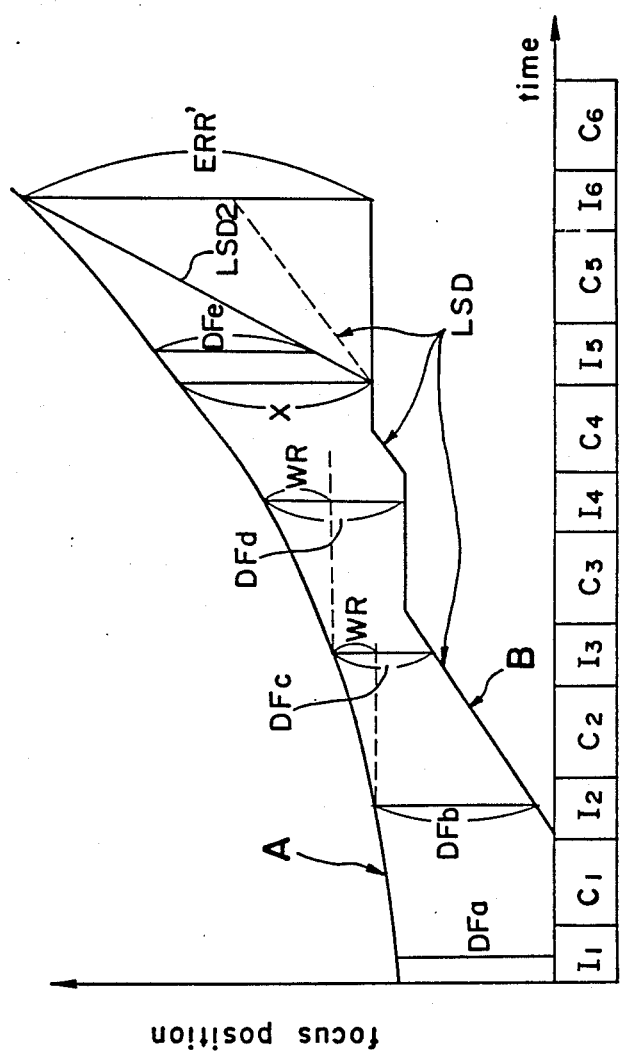
FIG. 16 is a graph showing a second example according to the present invention.

FIG. 16 is a graph showing the change of the focus position of the photographic lens when the object is drawing near to the camera in the second example according to the present invention. In FIG. 16, in case it is judged in the calculation $C_4$ that the tracking mode is set, the lens movement amount ERR becomes larger than the value NZC2 (NZC>NZC2) when the movement amount of the photographic lens is obtained by the calculation of the tracking compensation, therefore, the lens driving speed is switched from the speed LSD to the speed LSD2 so as to start the tracking compensation. In case the photographic lens is moved in the driving speed LSD, the movement of the in-focus position of the photographic lens does not catch up the movement of the object as shown the dotted line in FIG. 16. However, upon switching the lens driving speed from the speed LSD into the higher speed LSD2 as shown in this example, it is possible that the movement of the in-focus position of the photographic lens catches up the movement of the object.

FIG. 17 is a flowchart for switching the lens driving speed. In FIG. 17, first in the step S1701 it is judged whether or not the lens movement amount ERR is larger than the value NZC2, and in case of ERR>NZC2 the program goes to the step S1702 and the lens driving speed is set LSD2. Then, in the step S1703 it is judged whether the tracking flag is set or not (i.e. the tracking mode is set or not), and in case the tracking mode is not set (tracking F=0), the program goes to the step S1704 and the speed lock flag is reset. On the contrary, in the step S1703 in case the tracking mode is set (tracking F=1), the program goes to the step S1705 and the speed lock flag is set, preventing the lens driving speed LSD2 from going back to the low speed LSD once the lens driving speed is switched into the high speed LSD2 when the lens movement amount becomes larger than the predetermined value in the tracking mode. Then, the program goes to the step S1708 from the step S1704 or S1705 and the lens movement amount ERR is set in the event counter EVTCNT and then the program goes to the step S1008 in FIG. 10.

In the next calculation period of the focus detection, the lens movement amount ERR decreases and in the step S1701 in FIG. 16 in case of ERR≦NZC2, the program goes to the step S1706 and it is judged whether the speed lock flag is set or not, and in case the speed lock flag is set, the lens driving speed is maintained as it is and the program goes to the step S1008. On the other hand, in case the speed lock flag is not set 1 in the step S1706, the program goes to the step S1707 and the lens driving speed is set in the low speed LSD and the program goes to the step S1708. In this way the photographic lens can be moved as shown in FIG. 16.

Furthermore, FIG. 18 is a flow chart showing the operation of a third example according to the present invention. Though the lens driving speed is controlled independently of the tracking mode in the second example as shown in FIGS. 16 and 17, the lens driving speed may be controlled depending on the tracking mode so that the lens driving speed is always set in the high speed LSD2 whenever the operation is in the tracking mode. The third example shown in FIG. 18 is constructed as mentioned above. In FIG. 18, in the first step S1801 it is judged whether the tracking flag is set 1 or not (i.e. the tracking mode is set or not). In case the tracking flag is set and the operation is in the tracking mode, the program goes to the step S1802 and the lens driving speed is set in the high speed LSD2. On the contrary, in case the tracking flag is not set and the operation is not in the tracking mode, the program goes to the step S1803 and the lens driving speed is set in the low speed LSD. Then, the program goes to the step S1804 from the step S1802 or S1803 and the lens movement amount ERR is set in the event counter EVTCNT as well as in the step S1708 and the program goes to the step S1008 in FIG. 10.

According to the present invention, the time and position of the photographic lens when and where the movement of the in-focus position of the photographic lens catches up the movement of the object can be calculated from the present defocus amount. The relative movement speed of the object and the defocus amount at this time and position caused by the relative movement of the object is estimated and the photographic lens is driven so that the defocus amount becomes 0 at the above mentioned time and position, therefore, the defocus amount at the end of the lens driving, which is produced because of the time lag of the lens driving, can be made minimum, so that the in-focus condition of the photographic lens can be obtained in a short time.

In the above-mentioned first to third embodiments, though the time point when the photographic lens catches up the movement of the moving object is calculated and the defocus amount with reference to the relative movement of the object at that time is estimated and the time point to be caught up is settled as the destination of the tracking compensation, the defocus amount with reference to the relative movement of the object at the end of the calculation of the next focus detection may be estimated and the time point of the end of the calculation of the focus detection may be determined as the target of the tracking compensation. Fourth and fifth embodiments incorporating this principle are described as follows.

Figure 19:
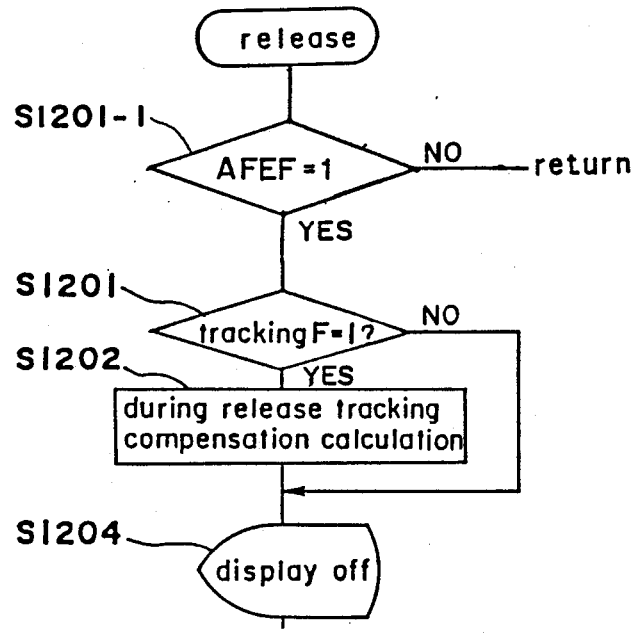
FIG. 19 is a flowchart showing a modification of the operation shown in FIGS. 6(A) and 6(B), FIGS. 20 and 21 are flowcharts showing another modification of the operation shown in FIG. 12, FIGS. 22, 26, 30 sre flowcharts showing a further modification.
Figure 22:
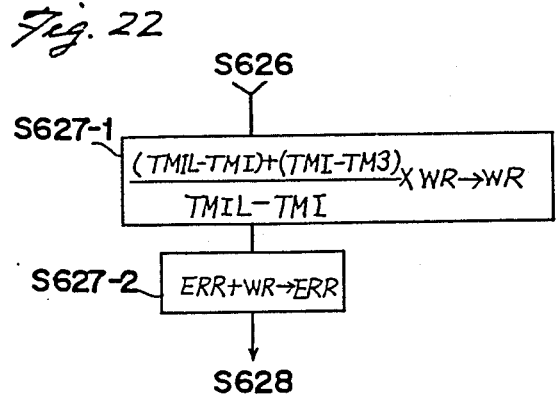
Figure 23:
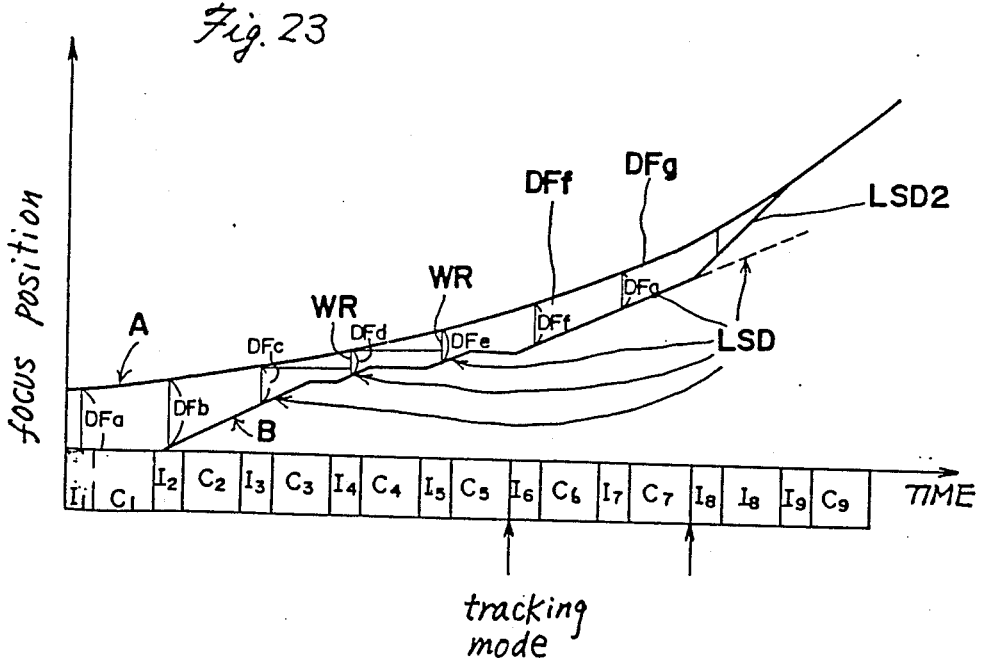
FIGS. 23, 25, 27, 31 and 32 are graphs showing the relation between the focus position and time.
Figure 25:
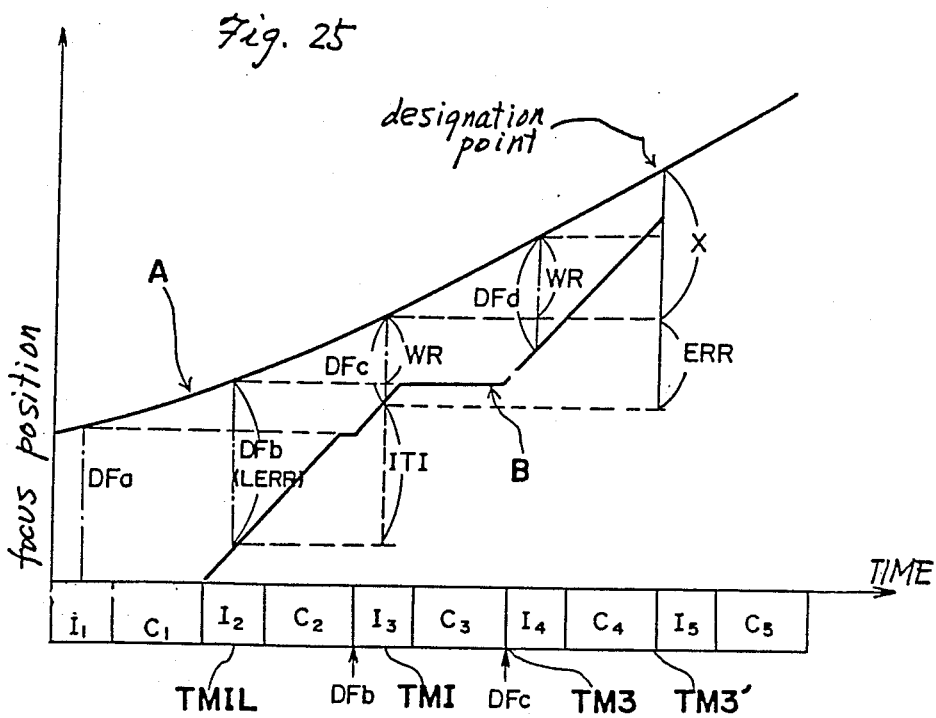
Figure 26:
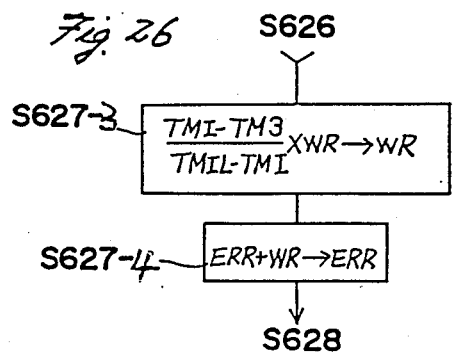

In the fourth embodiment, since only the flow shown in FIG. 22 of the flows according to the first embodiment may be changed, the corresponding flow shown in FIG. 19 is only described and other explanations are omitted. Even though the movement delay amount WR of the object in one period of the object caused by the movement of the object is compensated, the photographic lens is stopped during the calculation C4 but the object is moving after the lens stopping until the time TM3' when the next calculation result is obtained so as to cause the tracking delay. The tracking delay is shown by an intersection point Y' of the movement line of the photographic lens with the defocus amount Y which is the defocus amount DFC added by the value WR as shown in FIG. 25.

Therefore, the in-focus condition can not be obtained even if the photographic lens is moved corresponding to the defocus amount DEc at the time TM3. Hence, if the compensation is executed targeting the time TM3' when the next integration I4 and calculation C4 are finished and a new defocus amount DFd is calculated, an effective and suitable compensation can be obtained. Therefore, the relative movement amount X of the object has to be compensated in the period from the time TMI when the actual defocus amount is DFc to the time TM3'.

Assuming that the movement amount of the object from the time TMIL to the time TMI is WR, the inclination 'a' representing the movement speed of the object in this period is calculated as follows:

$$a = \frac{WR}{TMIL - TMI}$$

hence, the movement amount of the object from the time TMI to the time TM3 is obtained as follows:

$$\frac{TMI - TM3}{TMIL - TMI} \times WR$$

The period from the time TM3 to the time TM3' is approximated as follows:

$$TM3 - TM3' = TMIL - TMI$$

The movement amount of the object in this period is represented as follows:

$$\frac{TMIL - TMI}{TMIL - TMI} \times WR$$

Therefore, the movement amount X of the object from the time TMI to the time TM3' is calculated as follows:

$$X = \frac{(TMIL - TMI) + (TMI - TM3)}{TMIL - TMI} \times WR$$
$$= \frac{TMIL - TM3}{TMIL - TMI} \times WR$$

The calculated movement amount X of the object is compensated as the value WR in the step S627-1 and in the next step S627-2 the lens driving amount ERR is compensated by the compensation value WR.

As described above, the defocus amount caused by the movement of the object at the end of the next calculation of the focus detection is obtained, and corresponding to the obtained defocus amount the photographic lens is moved for the tracking compensation targeting the end of the calculation. In this way, since the compensation is executed estimating the movement amount of the object in one period of the calculation, an effective and suitable compensation can be executed. Moreover, since the next calculation result can be obtained at the time when the lens driving for the compensation is finished, even if there is an error after the photographic lens is moved, the defocus amount is renewed for the compensation at the time when the error becomes maximum, therefore, there is no fear that the AF precision is lowered.

Figure 21:
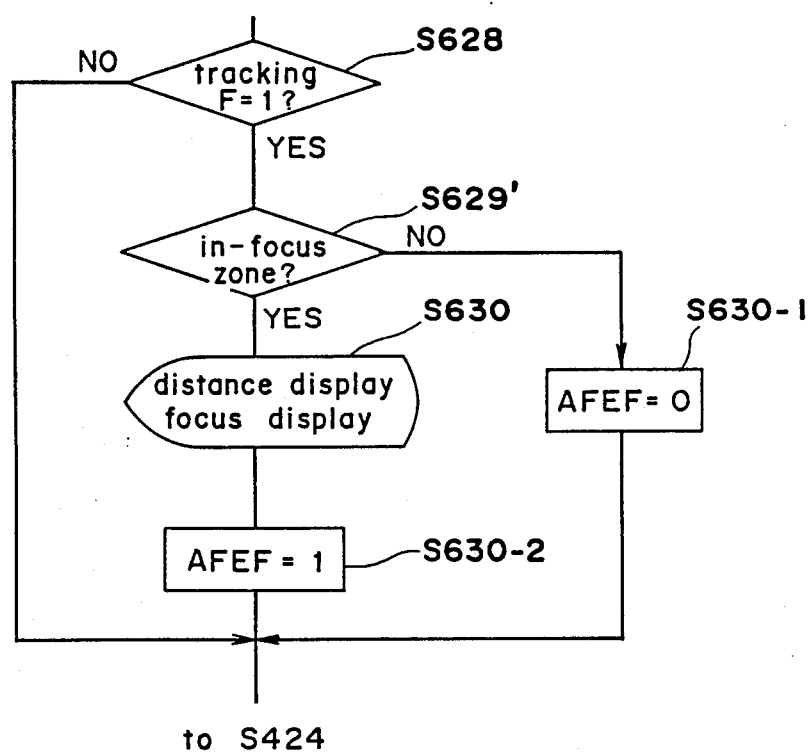

FIGS. 21 and 22 are a graph and a flowchart showing the operation of a fifth example according to the present invention. In the fifth example according to the present invention, in case the object is moving far away from the in-focus position of the photographic lens after the tracking mode is set, the lens driving speed is increased to the high speed LSD2 from the low speed LSD, so that the tracking ability is improved.

Figure 20:
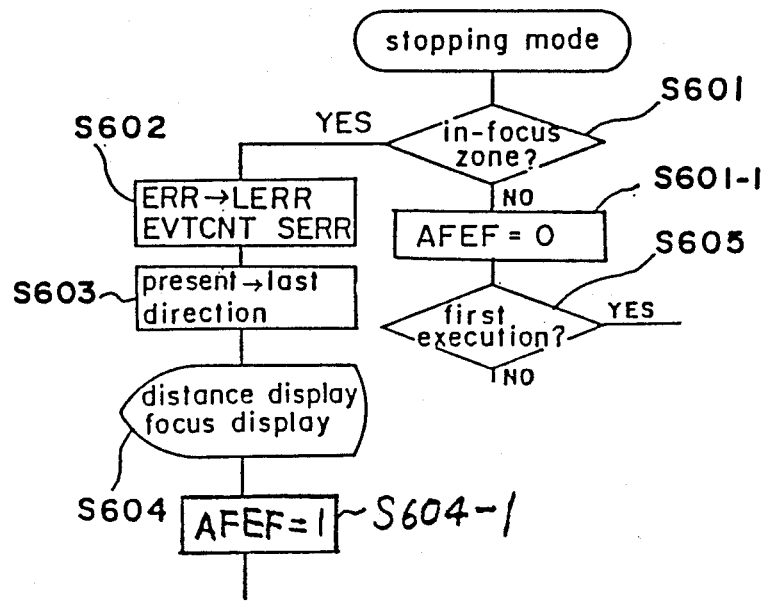

FIG. 21 is a graph showing the relation of the changes of the in-focus positions of the photographic lens and object when the object is drawing near the camera as well as shown in FIG. 20. In FIG. 21 in case the tracking mode is set at the end of the calculation $C_5$, the lens driving is controlled by the tracking mode from the beginning of the integration $I_6$, and in case it is judged by the calculation $C_7$ that the movement of the in-focus position of the photographic lens does not catch up the movement of the object, the lens driving speed is turned to the high speed LSD2 from the low speed LSD. Thus, it becomes possible for the movement of the in-focus position of the photographic lens to catch up to the movement of the object as shown by the real line even in case the movement of the in-focus position of the photographic lens can not catch up the movement of the object if the lens driving speed is kept in the low speed LSD as shown by the dotted line.

Figure 24:
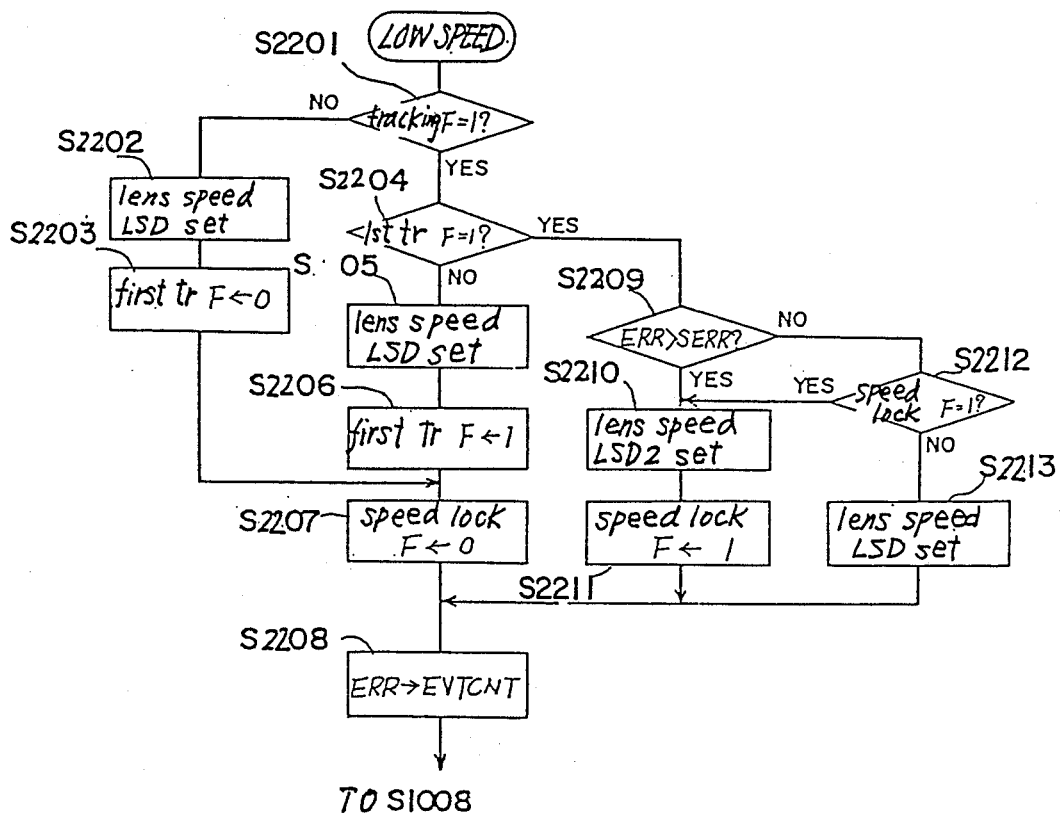
FIGS. 24, 28, 29 and 33 are flowcharts showing further embodiment of the present invention.

The operation in the above mentioned case is explained with reference to FIG. 24. FIG. 24 is a partial modification with respect to the step S1006 in FIG. 10. First in the step S2201 it is judged whether or not the tracking flag is set 1 (tracking F=1) and the tracking mode is set or not. In case the tracking flag is not set and the operation is not in the tracking mode, the program goes to the step S2202 and the lens driving speed is set to the low speed LSD and in the step S2203 the tracking first time flag showing a first time tracking mode is reset. In the step S2207 the speed lock flag is reset and next in the step S2208 the lens movement amount ERR is set in the event counter EVTCNT and then the program goes to the step S1008. On the contrary, in case the tracking flag is set and the operation is in the tracking mode in the step S2201, the program goes to the step S2204 and it is judged whether the tracking first time flag is set or not. In case the tracking first time flag is not set, the program goes to the step S2205 and the lens driving speed is set to the low speed LSD and in the step S2206 the tracking first time flag is set and then the program goes to the step S2207.

In the tracking mode, in case the defocus amount does not decrease but increases on the contrary in spite the movement of the photographic lens in tracking the movement of the object in the low lens driving speed LSD, the program goes to the step S2209 from the steps S2201 and S2204 and the present lens movement amount ERR is compared with the last lens movement amount SERR set in the event counter EVTCNT. In case the in-focus position of the photographic lens is not drawing near the object even in the tracking mode (in case of ERR>SERR), the program goes to the step S2210 and the lens driving speed is set to the high speed LSD2, and in the step S2211 the speed lock flag is set and then the program goes to the step S2208. The step S2211 is provided in order that once the lens driving speed is turned to the high speed LSD2, the photographic lens is moved in the high driving speed LSD2 till the in-focus position of the photographic lens catches up the movement of the object.

Moreover, in the period of the next focus detection calculation, in case the in-focus position of the photographic lens is drawing near the object (in case of ERR≦SERR in the step S2209), the program goes to the step S2212 and it is judged whether the speed lock flag is set 1 or not. In case the speed lock flag is set 1, the program goes to the step S2210 and the lens driving speed is retained in the high speed LSD2. In case the speed lock flag is not set, the program goes to the step S2213 and the lens driving speed is set to the low speed LSD and then the program goes to the step S2208.

Since the switching of the lens driving speed LSD or LSD2 does not affect the tracking compensation, it is not necessary for the tracking compensation to be furthermore compensated owing to the switching of the lens driving speed. In the above fifth example, though the lens driving speed is switched in the two steps, the present invention is not limited to this but it is needless to say that the lens driving speed may be switched in more than three steps.

According to the present invention, the defocus amount caused by the movement of the object at the end of the next calculation of the focus detection is obtained and the photographic lens is moved corresponding to the obtained defocus amount in order that the tracking compensation is completed at the end of the calculation. Therefore, the effective and correct compensation can be executed and the in-focus condition can be obtained in a short time.

As the other embodiment of the present invention, the present defocus amount caused by the relative movement of the object is calculated and the time point of the end of the calculation may be used as the target of the tracking compensation. This approach is incorporated into the sixth embodiment of the present invention as explained below. Since only the flow shown in FIG. 8 among the flows of the first embodiment may be changed, only that flow is explained.

Assuming that the movement amount of the object during the period from the time TMIL to the time TMI is WR, the inclination 'a' representing the movement speed of the object in this period is represented as follows:

$$a = \frac{WR}{TMIL - TMI}$$

Therefore, assuming that the movement amount of the object at the present time TM3 is X, the value X is represented as follows;

$$X = a \times (TMI - TM3)$$
$$= \frac{(TMI - TM3)}{(TMIL - TMI)} \times WR$$

The obtained movement amount X of the object is compensated as the value WR in the step S627-3 and the lens driving amount ERR is compensated depending on the compensation value WR in the step S627-4.

The lens driving amount ERR represents the distance from the camera to the object at the present time at the unit of pulse count number. Therefore, the destination value of the compensation is adopted as the present compensation value, whereby it becomes possible that in distance from the camera to the object is displayed by the real time simultaneously with the calculation timing.

Moreover, as in the other embodiments of the present invention, the focus detection is successively executed and the changing amounts of the defocus amounts caused by the relative movements of the object at respective time points are respectively calculated by the defocus amounts and the lens movement at respective time points and the tracking compensation may be executed by the changing amount weighted properly (filtering).

A seventh embodiment of the present invention is explained as follows.

Figure 27:
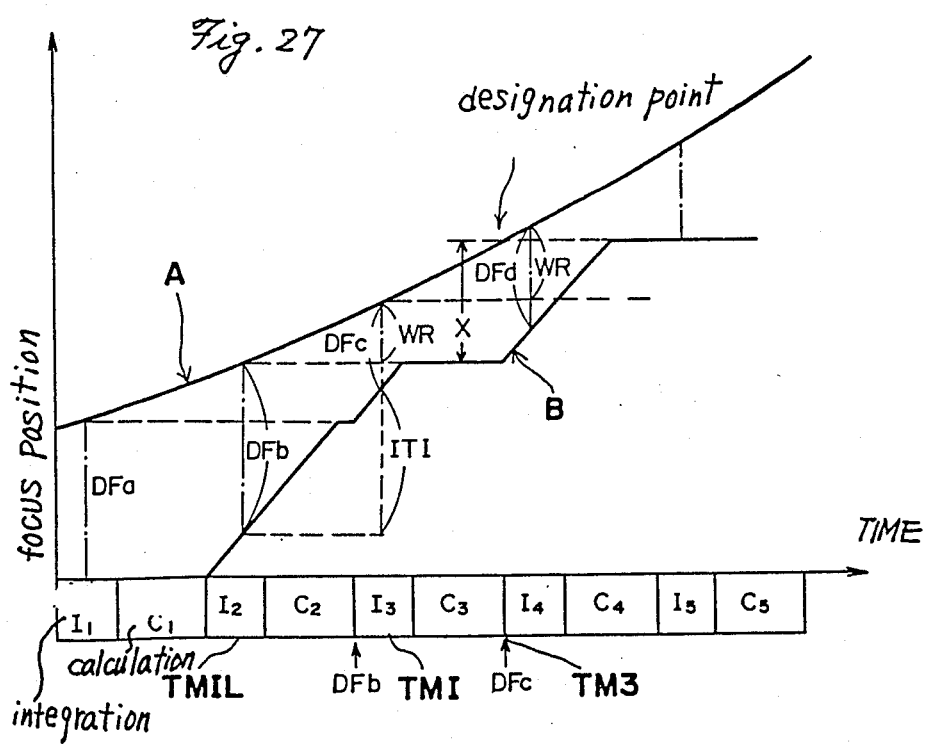
Figure 28:
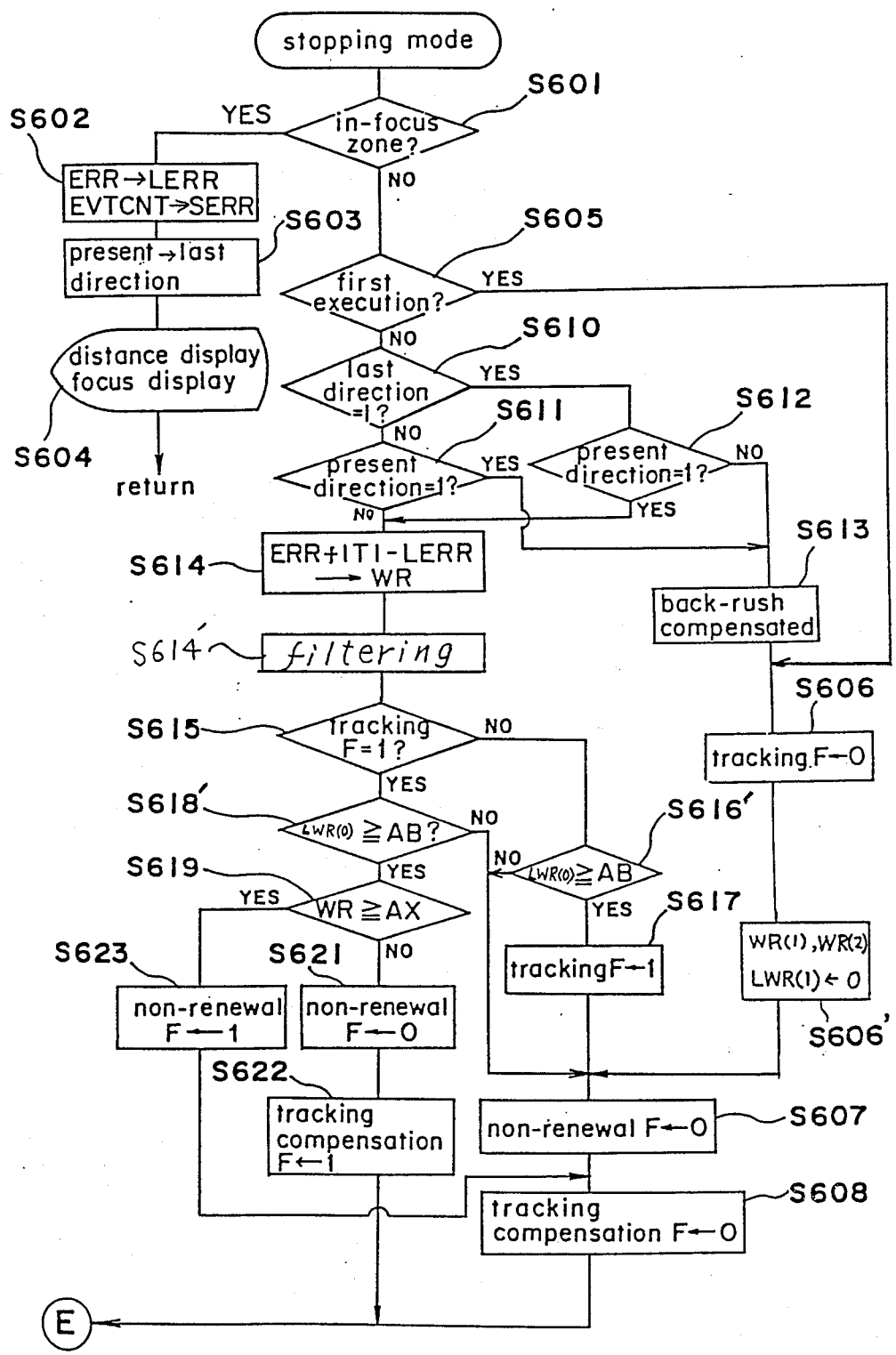
Figure 29:
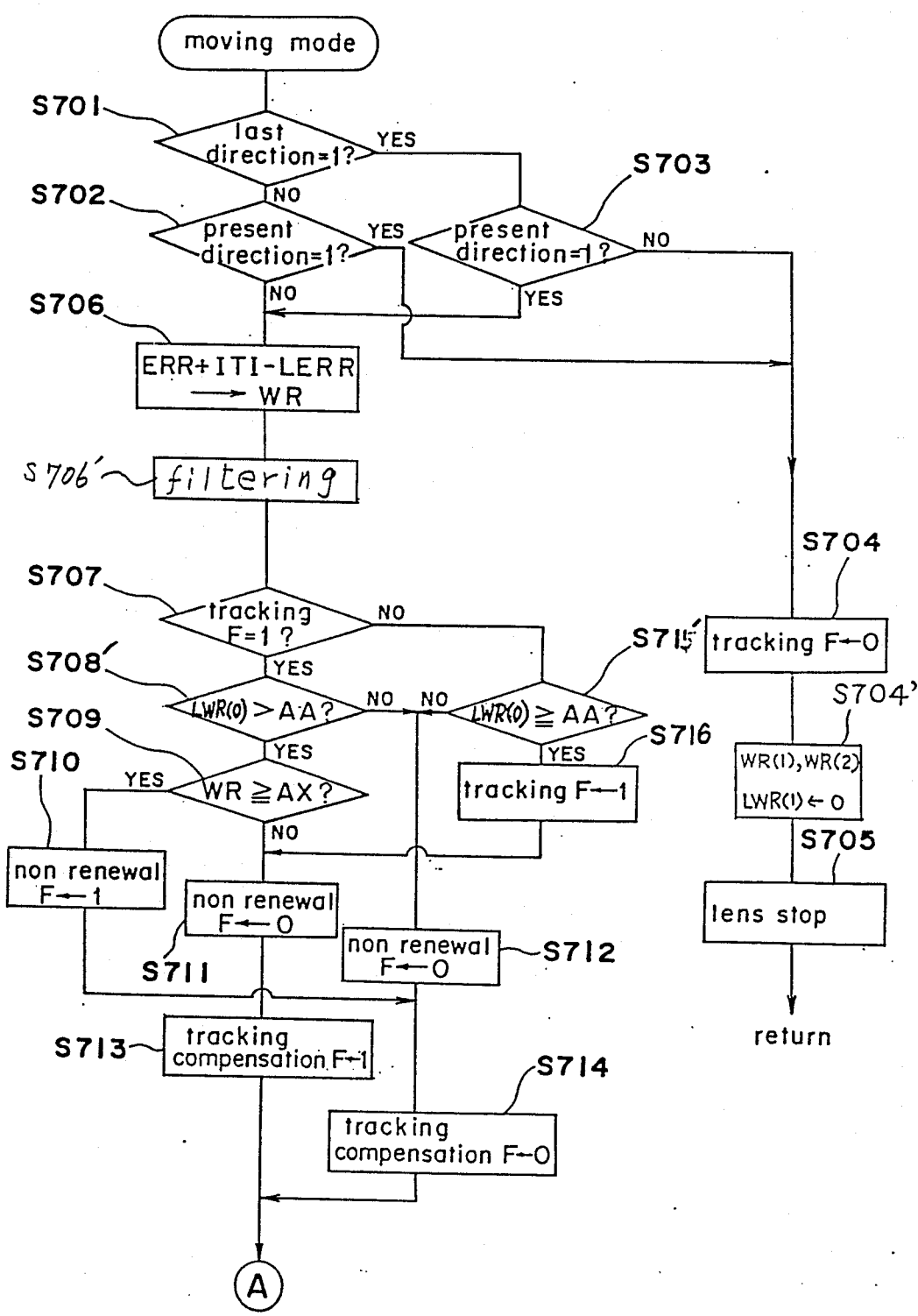

FIGS. 28 and 29 are the flowcharts corresponding to FIGS. 6 and 7 of the first embodiment and steps (S606', S614', S616', S618', S706', S708' and S715') with reference to the filtering for the flows in FIGS. 6 and 7 are added. FIG. 27 shows the way of calculating the movement amount WR of the object in the step S614.

Figure 32:
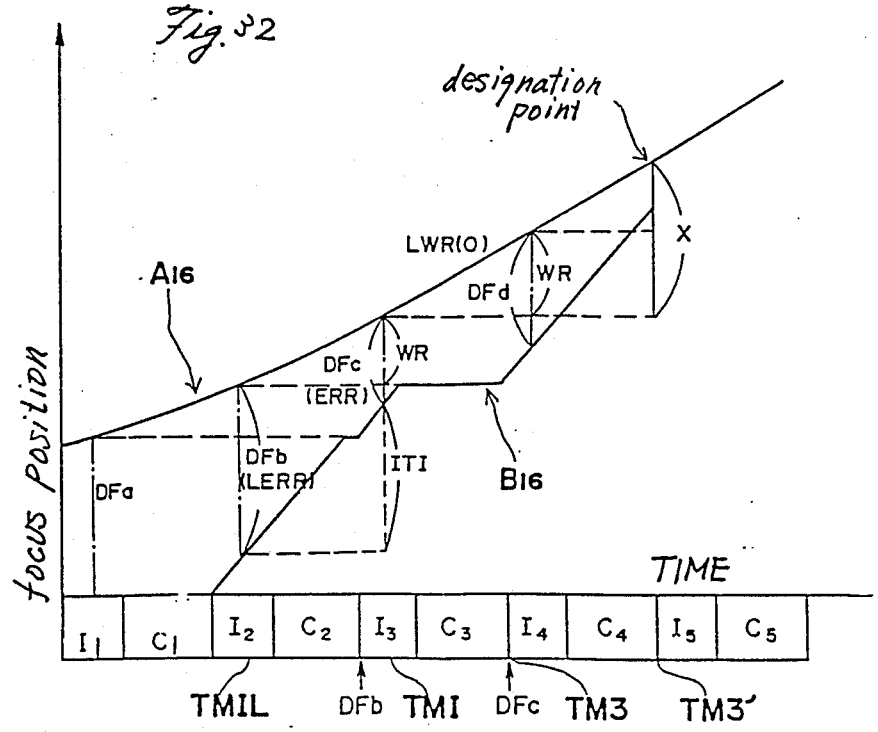

The defocus amount WR caused by the movement of the object, which is to be detected in the period between the center point TMIL of the integration $I_2$ and the center point TMIL of the integration $I_3$ is represented with reference to FIG. 32 as follows;

$$WR = ITI + DEc + DFb$$

wherein the value DFc represents the present defocus amount and is set into the present count value ERR of the lens driving in the unit of the pulse count in the step S409, and the value DFb represents the last defocus amount and is set into the last count value LERR of the lens driving in the unit of the pulse count in the step S624. Therefore, the above mentioned value WR is obtained as follows;

$$WR = ERR + ITL - LERR$$

Next, the filtering operation is executed and one example of the filtering process in the step S614' in FIG. 28 is shown in FIG. 36.

In the operation of the focus detection, there generally occurs dispersions in the detection values by the noise generated in the CCD image sensor 107 and in the circuits in the camera. That is, since the count values ERR and LERR in the step S614 have dispersions, the dispersions are included in the defocus amount WR obtained by the above mentioned calculation. Therefore, in case the compensation is made by the defocus amount WR, a stable control can not be done because of the dispersions and there occurs a problem in the AF precision. Hence, the average value of the past detection data is considered in order to absorb the dispersions, that is, the changing amount WR(0) of the defocus amount per a unit time is calculated by the calculation WR/(TMIL−TMI) in the step S1401. The changing amount WR(0) of the defocus amount represents the defocus speed of the object in the direction of the optical axis. In the next step S1402 it is judged whether or not the changing amount WR(0) is larger than the predetermined value HS, and in case the movement speed of the object is large and the changing amount WR(0) is larger than the predetermined value HS, the program goes to the step S1403 and the averaged changing amount LWR(0) is calculated by the changing amount LWR(1) obtained by the last calculation to be described in the next step S1404 and by the present changing amount WR(0) as follows;

$$LWR(0) = [LWR(1) + WR(0)]/2 \quad \dots \quad (1)$$

In the step S1404, the present calculation value LWR(0) is set as the last calculation value LWR(1) because the present value LWR(0) is used as the last calculation data in the process of the next cycle. On the other hand, in case the movement speed of the object is small and the changing amount WR(0) is smaller than the predetermined value HS, the program goes to the step S1405 and the averaged changing amount LWR(0) is calculated by the following calculation and the program goes to the step S1404.

$$LWR(0) = [3 \cdot LWR(1) + WR(0)]/4 \quad \dots \quad (2)$$

Accordingly, the averaged changing amount LWR(0) obtained in the step S1403 includes the past data in the relation as shown in the equation (3). Similarly the averaged changing amount LWR(0) obtained in the step S1405 includes the past data in the relation as shown in the equation (4).

$$LWR(0) = (\tfrac{1}{2}) \sum_{i=0}^{\infty} (\tfrac{1}{2})^i \cdot WR(i) \qquad (3)$$

$$LWR(0) = (\tfrac{1}{4}) \sum_{i=0}^{\infty} (\tfrac{3}{4})^i \cdot WR(i) \qquad (4)$$

The value WR(i) represents the defocus amount WR of 'i' times before and the value 'i' is finite because the filtering operation is executed every each focus detection cycle. Comparing the abve mentioned two equations (3) and (4), the relative importance of including the past data is smaller in the equation (3) than that in the equation (4). In case of adopting the equation (3), good or rapid response ability can be obtained since the present data is made much of. On the other hand, in case of adopting the equation (4), there is an advantage that the above mentioned dispersions are absorbed since the past data is made much of.

Figure 34:
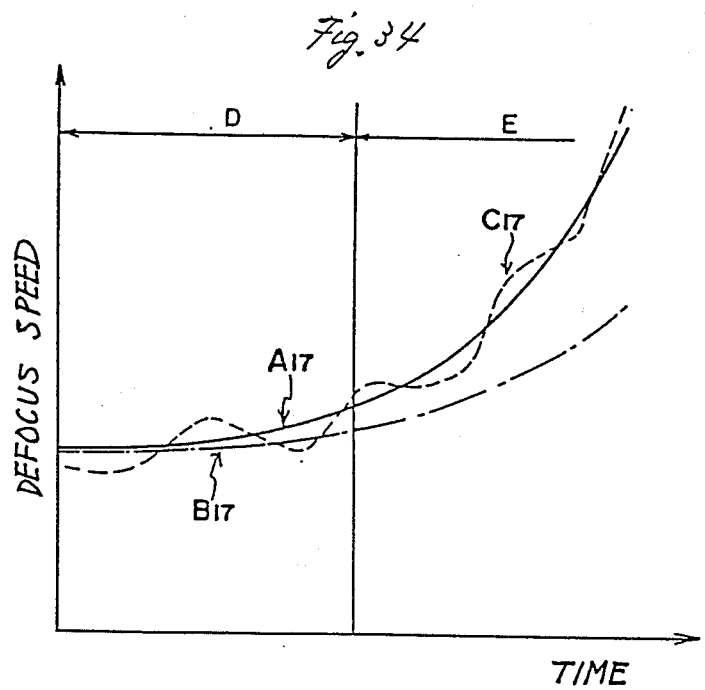
FIGS. 34 and 35 are graphs showing relation between the defocus speed and time.

Referring to FIG. 34, the vertical axis represents the changing speed of the defocus amount and the horizontal axis represents time. Reference mark $A_{17}$ represents the real changing speed of the in-focus position caused by the movement of the object. In case the filtering operation in which the relative importance of the past data is large as shown in the equation (4) is executed, the movement of the object is detected as shown by the reference mark $B_{17}$ when the object is moving. That is, the focus precision is high and stable in the area D where the movement speed of the object is small, but there occurs response delay in the area E where the movement speed of the object is changed largely. In case the filtering operation in which the relative importance of the present data is large as shown in the equation (3) is executed, the focus control does not have stability but has response ability as shown by the reference mark $C_{17}$. In other words, in the area D the filtering operation by the equation (4) has more advantages with respect to the focus precision and stability than by the equation (3) and in the area E the filtering operation by the equation (3) with good response ability has more advantages with respect to the focus precision and stability than that by the equation (4).

That is, in case the movement speed of the object is small, the equation (4) is adopted and the past data obtaining average data is made much of, whereby the dispersions are absorbed so that more correct data can be obtained. On the contrary, in case the object is moved suddenly, the equation (3) is adopted and the data obtained at present time is made much of than the past data, whereby good response ability can be obtained and the movement of the in-focus position of the photographic lens can track the rapid movement of the object.

In case the object moves in a constant speed in the direction of the optical axis, the distance of the in-focus position of the photographic lens is in inverse proportion to the time since the distance of the in-focus position is in inverse proportion to the distance of the position of the object. Moreover, the changing speed of the in-focus position of the photographic lens is in inverse proportion to the square of the time and is changed suddenly in a short time. Therefore, it is extremely effective to switch the filtering means as described above.

Though in the step S1402 the changing amount WR(0) of the movement of the object is compared with the predetermined value HS, it may be compared with the last averaged changing amount LWR(1). As shown in FIG. 37 a mere additional average of the past data may be adopted in stead of adopting the exponential average of the past data as shown in the equations (1) and (2). In case the changing amount WR(0) of the movement of the object is larger than the predetermined value HS, the program goes to the step S1406 and the averaged changing amount LWR(0) of the movement of the object is calculated as follows;

$$LWR(0) = [3 \cdot LWR(0) + 2 \cdot WR(1) + WR(2)]/6 \ldots \qquad (5)$$

wherein the values WR(1) and WR(2) represent the last and the last but one changing amounts of the movement of the object respectively. On the other hand, in case the changing amount WR(0) of the movement of the object is smaller than the predetermined value HS, the program goes to the step S1407 and the last averaged changing amount LWR(0) of the movement of the object is calculated as follows;

$$LWR(0) = [8 \cdot WR(0) + 7 \cdot WR(1) + 6 \cdot WR(2)]/21 \ldots \qquad (6)$$

That is, in case of adopting the equation (5), the focus control has good response ability as well as in case of adopting the equation (3), and in case of adopting the equation (6), the focus control has good stability as well as in case of adopting the equation (4). In the next step S1408 the last changing amount WR(1) of the movement of the object is set as the last but one changing amount WR(2), and in the step S1409 the present calculated changing amount WR(0) of the movement of the object is set as the last changing amount WR(1).

FIGS. 38 and 39 respectively show the other examples of the filtering process.

In FIG. 38, the averaged movement amount LWR(0) is calculated so as to make much of the stability in stead of judging the changing amount WR(0) of the movement of the object in the process shown in FIG. 36. In FIG. 39 the averaged changing amount LWR(0) of the movement of the object is calculated by the additional average from the present data WR(0) to the last but one data WR(2) in the step S1410 without judging the movement amount WR(0) of the object. In this case the past data may be made much of as well as in the process in the step S1407 shown in FIG. 37. In other words, the calculation in the step S1410 may be represented as follows;

$$LWR(0) = \frac{[n \cdot WR(0) + m \cdot WR(1) + 1 \cdot WR(2)]}{n + m + 1}$$

In this case, though the past two data (i.e., the last and the last but one data) are adopted, more past data may be adopted depending on the processing time and the capacity of the microcomputer 109.

Moreover, the defocus amount WR caused by the object may be used instead of filtering the defocus speed WR(0) of the object. Otherwise, after filtering the focus detection value, the defocus speed of the object may be calculated. In case of selecting the filtering means for making much of the present data, the lens driving motor had better be controlled in a higher speed in order to show that the object is moving in a high speed. Similar filtering process is executed in the step S706' in FIG. 29.

Going back to FIG. 28 in the step S615 it is judged whether the tracking flag is set 1 or not. Referring to the operation according to the flow chart, since the tracking flag is reset by the first time execution of this flow, the program goes to the step S616 from the step S615 at present time. In this step S616 it is judged whether or not the averaged changing amount LWR(0) of the movement of the object is larger than the predetermined value AB. The above mentioned predetermined value AB is set for the defocus speed in which the position of the photographic lens can be considered to be in the in-focus zone without the tracking compensation in consideration of the dispersion of the calculation value and the width of the in-focus zone.

In case the averaged changing amount LWR(0) of the movement of the object is less than the predetermined value AB in the step S616, the program goes to the step S607, but in case the averaged changing amount LWR(0) is more than the predetermined value AB, after the tracking flag is set 1 in the step S617, then the program goes to the step S607.

In this case, in the next execution of this flow since the tracking mode is set by setting the tracking flag, the program goes to the step S618 from the step S601 through the steps S614 to S615. In the step S618 as well as in the step S616 the averaged changing amount LWR(0) is compared with the predetermined value AB, and in case the averaged changing amount LWR(0) is less than the predetermined value AB, the program goes to the step S607 without the tracking compensation. In case the averaged changing amount LWR(0) is more than the predetermined value AB, the program goes to the step S619 and the movement amount WR of the object is compared with the other predetermined value AX which is much larger than the predetermined value AB. In case the movement amount WR of the object is less than the predetermined value AX, the non-renewal flag is reset in the step S621 and in the next step S622 the tracking compensation flag is set 1.

On the other hand, in case the movement amount WR of the object is more than the predetermined value AX, the program goes to the step S623 and the non-renewal flag is set 1 and then the program goes to the step S608 and the tracking compensation flag is reset. This flow is executed when the movement amount WR of the object is largely changed by changing the direction of the camera in the tracking mode. In this case the count value of the event counter EVTCNT is not renewed but the last count value is retained as it is and the tracking compensation is inhibited and the AF control is executed with the last count value, therefore, the tracking compensation is also inhibited. Thus, since the movement amount WR of the object is used before the filtering process is executed, there does not occur the response delay caused by the filtering process so that the movement amount WR can be detected in high speed.

Figure 30:
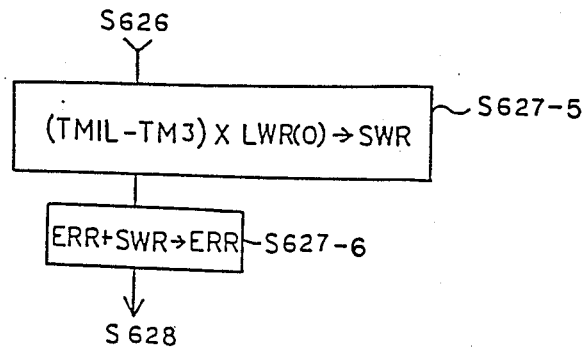
Figure 33:
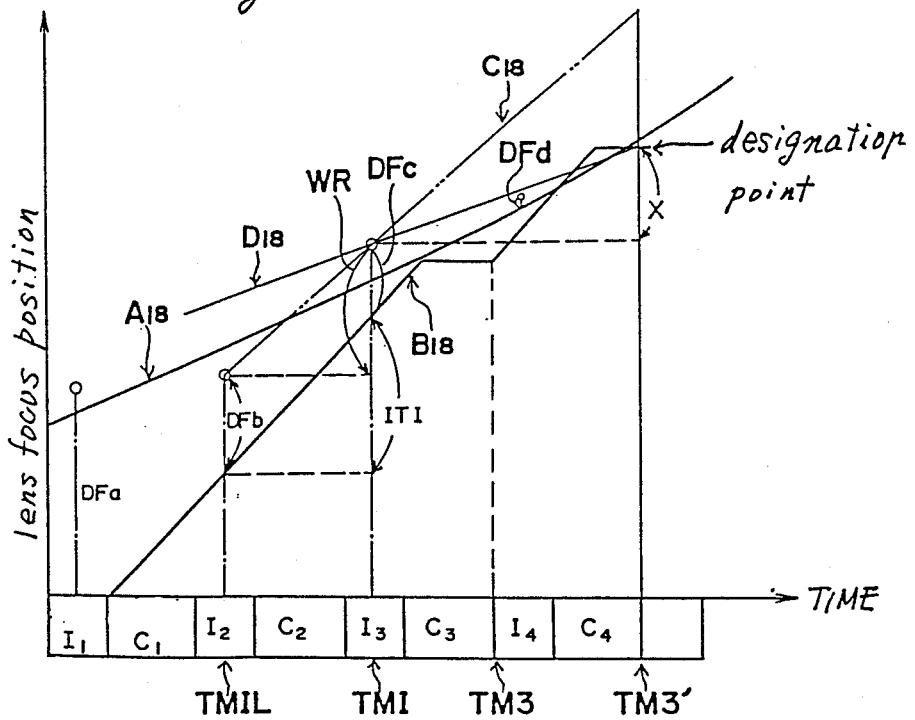

FIG. 30 shows the detailed contents of the calculation of the tracking compensation in the step S627 in FIG. 28 and the way of this tracking compensation will be explained with reference to FIG. 33.

Figure 35:
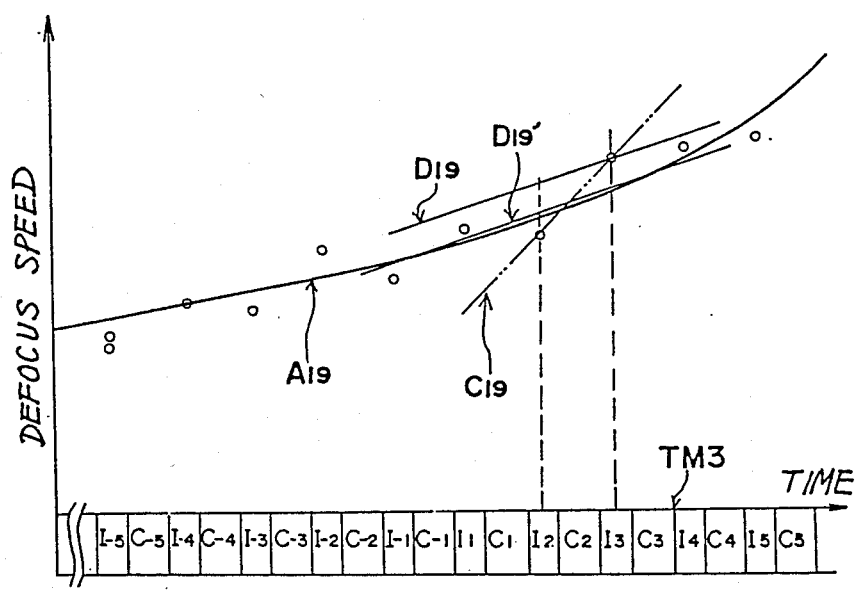

The present time is at the time TM3 of the end of the calculation $C_3$ and the movement amount WR of the object in one cycle between the center point TMIL of the last integration $I_2$ and the center point TMI of the present integration $I_3$ has been predetermined and the defocus amount DFc at the center point TMI of the integration $I_3$ has been also predetermined as described above. However, In FIG. 33 the line $A_{18}$ shows the real movement of the object and the detected defocus amount includes an error because of the electrical noise and the dark output of the circuit in the camera as described above. Assuming that the defocus amounts DFa, DFb and DFc at the center points of the integrations $I_1$, $I_2$ and $I_3$ are respectively obtained as shown in FIG. 33, the movement amount WR of the object has also the error. The movement amount WR detected at the time $TM_3$ of the end of the calculation $C_3$ shows that the object is moving as shown by the line $C_{18}$ and there occurs a large error compared with the line $A_{18}$ showing the real movement of the object. In the example according to the present invention, as described above, the dispersion of the detection value is absorbed by the filtering process, therefore, the movement amount WR of the object is detected as shown by the line $D_{18}$ so as to restrain the error. The above mentioned process is explained further in details with reference to FIG. 35. In FIG. 35, the vertical axis represents the defocus amount and the horizontal axis represents the time. The reference mark $A_{19}$ represents the real movement of the object and the white mark points represent the defocus detection values. To simplify the explanation, it is assumed that the photographic lens is stopping. Assuming that the defocus changing amount of the object is detected at the time TM3 by using the detection values at the integrations $I_2$ and $I_3$ respectively, the detection operation is influenced directly by the dispersion of the detection values between the two points of the integrations $I_2$ and $I_3$ and it is judged that the object is moving as shown by the line $C_{19}$. The detection values by the integrations before the integration $I_2$ are used for the detection of the changing of the defocus amount by the filtering process. That is, because the detection values at the times of the integrations $I_{-5}$ to $I_3$ are averaged, the defocus changing amount is detected as shown by the line $D_{19}'$ so as to restrain the occurrence of the error. The inclination of the line $D_{19}'$ represents the averaged movement amount LWR(0) of the object, i.e. the defocus speed of the object. The line $D_{19}$ whose inclination is same as that of the line $D_{19}'$ is a line passing through the point of the detection value at the integration $I_3$ and is corresponding to the line D18 in FIG. 33. Going back to FIG. 33, since the object is furthermore moving during the present lens driving, it becomes needless to compensate the defocus amount destining the present time TM3. Therefore, the effective and suitable compensation can be obtained in case the compensation is made destining the time TM3' when the next integration $I_4$ and the calculation $C_4$ are finished and a new defocus amount DFd is calculated. Therefore, all to be done is to compensate the relative movement amount X of the object between the time TMI when the real defocus amount DFc is detected and the time TM3' when the defocus amount DFd is detected. The movement speed of the object from the time TMIL to the time TMI has been already obtained as the value LWR(0) described before.

Therefore, the movement amount of the object from the time TMI to the time TM3 is represented as follows;

$$(TMI - TM3) \times LWR(O)$$

Assuming that the focus detection cycle is generally constant as shown by the equation TM3−TM3′=TMIL−TMI, the movement amount of the object from the time TM3 to the time TM3′ is represented as follows;

(TMI−TM3)×LWR(0)

Therefore, the movement amount X of the object from the time TMI to the time TM3′ is represented as follows;

$$X = \{(TMIL - TMI) + (TMI - TM3)\} \times LWR(0)$$
$$= (TMIL - TM3) \times LWR(0)$$

The obtained movement amount X of the object is set as the compensation value SWR in the step S627-5 and in the step S627-6 the lens driving amount ERR is compensated with the compensation value SWR.

Figure 13:
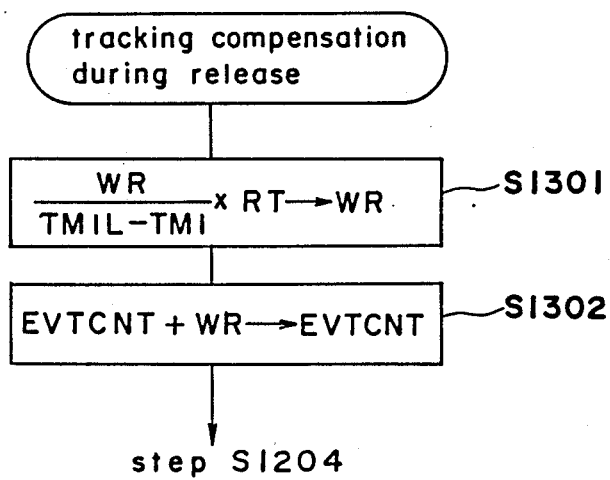
Figure 31:
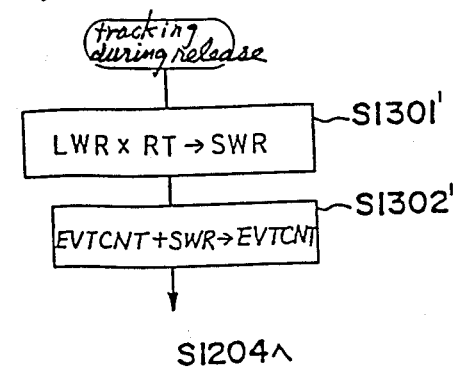

FIG. 31 shows the flow corresponding to FIG. 13 of the first embodiment. In the step S1301′ the reference value RT represents the release time lag which is peculiar to the camera and is a constant value. The value LWR(0) represents the filtered defocus changing amount of the moving object per a unit time, hence, the value LWR(0)·RT represents the tracking delay amount in the release time lag and the value LWR(0)·RT is used as the movement defocus amount SWR of the object. In the next step S1302′ the count value of the event counter EVTCNT is compensated by adding the above obtained movement defocus amount SWR.

In the seventh example the defocus changing amount caused by the movement of the object can be compensated correctly and stably by the filtering operation. Moreover, in case the defocus changing amount caused by the movement of the object is small, the averaging process making much of the past data is executed, whereby the dispersion is absorbed and the stable tracking compensation can be done. Furthermore, in case the defocus changing amount is large, the averaging process making much of the present data is executed, therefore, good response ability can be obtained and the focus control of the photographic lens can be executed by tracking the movement of the object moving in a high speed.

Accordingly the focus control of the photographic lens can be executed by tracking the movement of the object moving in a high speed and the correct and stable compensation can be done for the movement of the object by the filtering operation. Moreover, since a suitable compensation can be done by suitable filtering means corresponding to the condition of the movement of the object, the focus control can be done in the manner that in case the movement speed of the object is high, the response ability is required, and on the other hand, in case the movement speed of the object is low, the stability is required rather than the response ability.

Figure 6B:
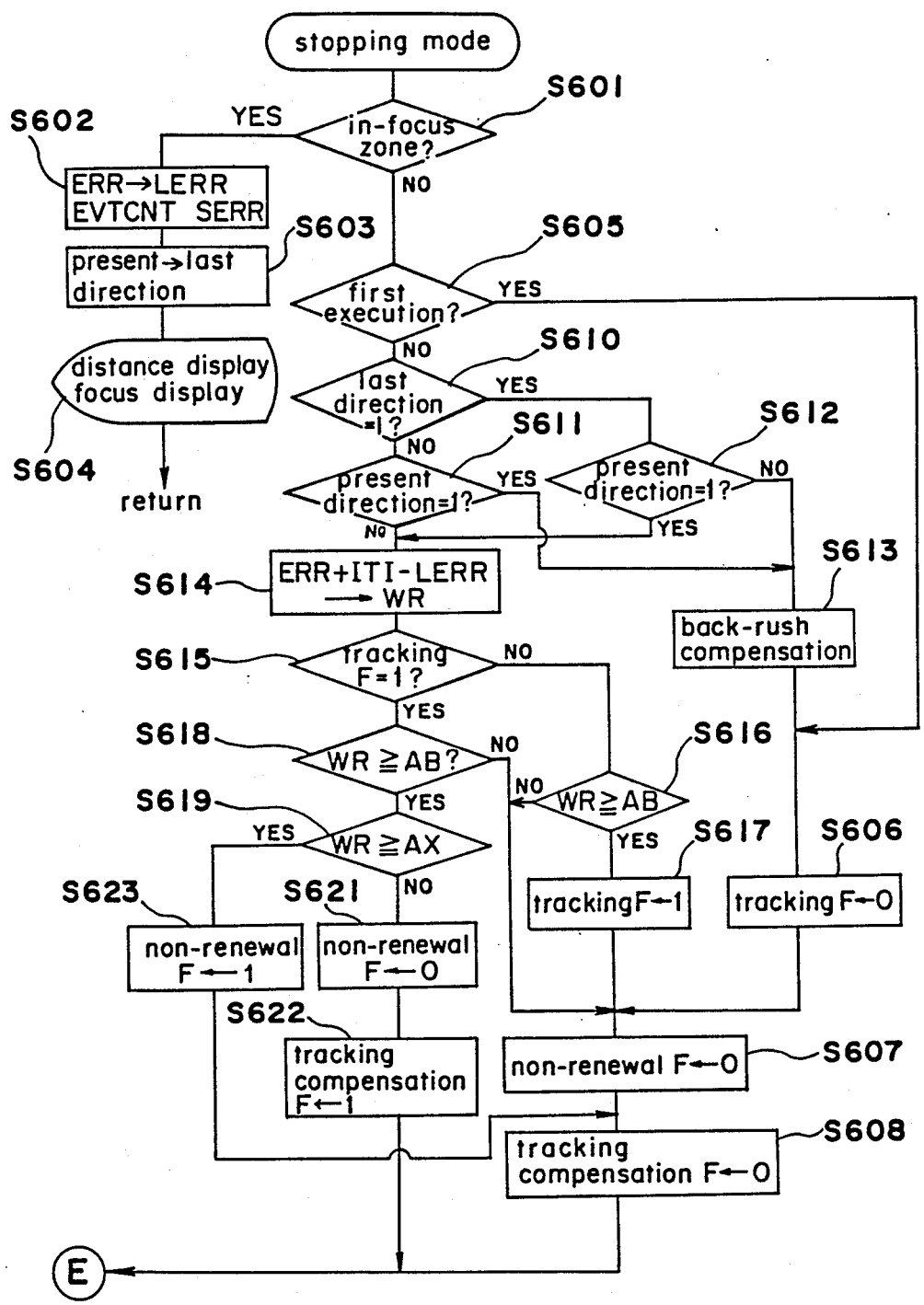

In the first to seventh examples, if the shutter release button is pressed, the shutter release is executed irrespective of whether the photographic lens is set in the in-focus condition or not, but the modification can be so made that the shutter release is permitted only in case the lens is set in the in-focus condition at the beginning of the exposure (so called an AF priority mode). The example in case of applying the AF priority mode to the first example for example is explained with reference to FIGS. 19 to 21. FIGS. 19 to 21 show only the flow which is different from first embodment shown in FIGS. 12, 6A and 6B.

FIGS. 20 and 21 show method of setting or resetting an in-focus flag AFEF used for the control of shutter release operation shown in FIG. 19. In FIG. 20, it is judged while the lens is stopped in the step S601 whether or not the lens is in in-focus zone. In case of out-of-focus, the in-focus flag AFEF is reset in the step S601-1. In case of in-focus, the flag AFEF is set in the step S604-1 after displaying in-focus in the step S604.

After the judgment of the tracking mode in the step S628 in FIG. 21, it is judged in the step S629′ based on the calculated defocus amount to be tracking compensated, whether or not the lens is in in-focus zone. In case the judgment in the step S629′ is no, the program goes to the step S630-1 to reset the flag AFEF to 0. In case the judgment in the step S629′ is yes, the program goes to the step S630-2 through the in-focus display step S630 to set the flag AFEF to 1. This operation can be performed in the AF priority mode, and the tracking compensation defocus is in the focus position, the release of the camera is enabled.

By the operation mentioned above, in-focus condition of the lens is displayed only when the lens will be brought into in-focus zone at the time of shutter release. Thus, the operator of the camera can confirm the in-focus condition, viewing the image in the finder, and allowability of the shutter release, so that the operator can be confident the camera is operating properly.

In FIG. 19, it is judged in the step S1201-1 whether or not the in-focus flag AFEF is set. If the flag is set, the program goes to the step S1201 to allow the shutter release operation. If the flag AFEF is not set, the program returns to inhibit the shutter release operation. In this case, the step S1203 in FIG. 12 is omitted because when the lens is in in-focus zone but not in the tracking mode, the lens is already stopped.

What is claimed is:
1. An automatic focus control device for use in a camera, comprising:
measuring means for measuring a position of an object to be photographed with reference to the camera to produce a measurement value;
first calculation means for repeatedly calculating a lens defocus value of a photographic lens based on the measurement value of the measuring means;
judging means for judging whether the object is moving on the basis of the repeatedly calculated lens defocus value of the first calculation means;
second calculation means, responsive to an affirmative judgment of the judging means and based on the repeatedly calculated lens defocus value, for calculating an estimated defocus value of the photographic lens, the estimated defocus value corresponding to a condition of the photographic lens with respect to the moving body at a time when the second calculation means is finished calculating; and
lens driving means for driving the photographic lens on the basis of the estimated defocus value.
2. The automatic focus control device according to claim 1, wherein said measuring means is light receiving means having a plurality of light receiving elements of charge integration type which produces an output corresponding to a light intensity of the photographic object.

3. The automatic focus control device according to claim 1, wherein said judging means detects the moving body by comparing a difference between a present defocus value and a past defocus value with a predetermined value, thereby calculating a movement speed of the object based on the difference of the defocus values.

4. The automatic focus control device according to claim 3, wherein the movement speed of the moving body is calculated based on a change of the repeatedly calculated lens defocus value per unit time and said second calculation means multiplies the change of the defocus value per unit time with a time length from a beginning of the measurement by the measuring means to the finish of the calculation of the second calculation means to calculate the defocus value due to the movement of the photographic object, and the calculated defocus value due to the movement of the photographic object is added to the lens defocus value calculated by the first calculation means, whereby the estimated defocus value is calculated.

5. The automatic focus control device according to claim 1, further comprising focus detecting means for detecting an attainment of an in-focus condition by comparing the estimated defocus value with a predetermined value and means for indicating an attainment of an in-focus condition.

6. An atuomatic focus control device for use in a camera, comprising:
   measuring means for measuring a position of an object to be photographed with reference to the camera to produce a measurement value;
   first calculation means for repeatedly calculating a lens defocus value of a photographic lens based on the measurement value of the measuring means;
   judging means for judging whether the object is moving on the basis of the repeatedly calculated lens defocus value of the first calculation means;
   second calculation means, responsive to an affirmative judgement of the judging means and abased on the lens defocus values, for calculating an estimated defocus value of the photographic lens, the estimated defocus value corresponding to a condition of the photographic lens with respect to the object at a time when a subsequent second calculation in the second calculatiom means is finished; and
   lens driving means for driving the photographic lens based on the estimated defocus value.

7. The automatic focus control device according to claim 6, wherein said measuring means is light receiving means having a plurality of light receiving elements of charge integration type which produces an output corresponding to a light intensity of the photographic object.

8. The automatic focus control device according to claim 6, wherein said judging means detects movement of the object by comparing a difference between a present defocus value and a past defocus value with a predetermined value, thereby calculating a movement speed of the object based on the difference of the defocus values.

9. The automatic focus control device according to claim 8, wherein the movement speed of the object is calculated by the difference of the defocus values per unit time and said second calculation means calculates the estimated defocus value in such a manner that the defocus value per unit time is multiplied with a time length from a beginning of the measurement by the measuring means to the finish of the subsequent second calculation of the defocus value in the second calculation means, thereby obtaining a total defocus value due to the movement of the object, and the total defocus value is further added with the lens defocus value calculated by the first calculation means.

10. An automatic focus control device for use in a camera, comprising:
    measuring means for measuring a position of an object to be photographed with reference to the camera to produce a measurement value;
    first calculation means for repeatedly calculating a lens defocus value of a photographic lens based on the measurement value of the measuring means;
    judging means for judging whether the object is moving on the basis of the repeatedly calculated lens defocus value of the first calculating means and for calculating a movement speed of the moving body;
    second calculation means for calculating an estimated defocus value of the photographic lens using the lens defocus value calculated in the first calculation means, a driving speed of the photographic lens and a movement speed of the object, the estimated defocus value corresponding to a time when the photographic lens is driven to an in-focus position with respect to the object; and
    means for driving the photographic lens on the basis of the estimated defocus value.

11. The automatic focus control device according to claim 10, wherein the measuring means is light receiving means having a plurality of light receiving elements of integration type which produces an outputs corresponding to a light intensity of the photographic object.

12. The automatic focus control device according to claim 11, wherein the second calculation means calculates an equation $bx/(b-a)$, in which a is the object speed, b is the lens speed and x is the lens defocus value of the first calculation means.

13. The automatic focus control device according to claim 12, wherein the second calculation means calculates an equation $bx/(b-a)$, in which x is a sum of the lens defocus value at a time of the measurement by the measuring means and a defocus value due to the movement of the object, the defocus value due to the movement of the object being calculated by multiplying the movement speed of the object with a time period from the beginning of the measurement to the finish of the calculation in the second calculation means and the lens means starting the lens driving when the calculation is completed.

14. An automatic focus control device for use in a camera, comprising:
    measuring means for measuring a position of an object to be photographed with reference to the camera to produce a measurement value;
    first calculation means for repeatedly calculating a lens defocus value of a photographic lens based on the measurement value of the measuring means;
    judging means for judging whether the object is moving on the basis of the repeatedly calculated lens defocus value of the first calculation means;
    second calculation means for repeatedly calculating an estimated defocus value of the photographic lens with respect to the object;
    averaging means for averaging a plurality of the estimated defocus values to produce an averaged defocus value;

third calculation means for calclulating a final defocus value by summing the lens defocus value calculated in the first calculation means and the averaged defocus value; and lens driving means for driving the photographic lens on the basis of the final defocus value.

15. The automatic focus control device according to claim 14, wherein the averaging means consists of a plurality of averaging elements for averaging each of the plurality of estimated defocus values with different weights and one of the averaging elements is selected for determining the averaged defocus value.

16. The automatic focus control device according to claim 15, wherein said one of the averaging elements is selected by the estimated defocus value.

17. The automatic focus control device according to claim 15, wherein said one of the averaging elements is selected on the basis of the averaged defocus value.

18. The automatic focus control device according to claim 15, wherein the averaging means averages the plurality of defocus values by using an arithmetic average.

19. The automatic focus control device according to claim 15, wherein the averaging means averages the plurality of defocus values by using exponential average.

20. An automatic focus control device for use in a camera, comprising:

measuring means for measuring a position of an object to be photographed with reference to the camera to produce a measurement value;

first calculation means for repeatedly calculating a lens defocus value of a photographic lens based on the measurement value of the measuring means;

judging means for judging whether the object is moving on the basis of the repeatedly calculated lens defocus value of the first calculation means;

second calculation means for calculating a defocus valve for driving the photographic lens on the basis of the lens defocus value in the first calculation means and the judgment in the judging means;

lens motion judging means for judging whether or not the photographic lens is presently moving; and focus detecting means for detecting that the photographic lens is in an in-focus condition with respect to the defocus value, whereby the detecting means performs the detection of the in-focus condition in response to an affirmative judgement that the object is moving and of a lens movement and said detecting means does not perform the detection of the in-focus condition during a lens movement in response to a judgment that the object is not moving.

21. The automatic focus control device according to claim 20, wherein the focus detecting means perform the focus detection despite that it is detected that the photographic object is a moving body when it is judged that the lens is stopped.

22. The automatic focus control device according to claim 20, further comprising display means for displaying an attainment of an in-focus condition.

23. The automatic focus control device according to claim 22, wherein said camera is set-table in an AF priority mode in which shutter release can not be performed unless the lens is in the in-focus condition.

24. The automatic focus control device for use in a camera, comprising:

measuring means for measuring a position of an object to be photographed with reference to the camera to produce a measurement value;

first calculation means for repeatedly calculating a lens defocus value of a photographic lens based on the measurement value of the measuring means;

judging means for judging whether the object is moving on the basis of the repeatedly calculated lens defocus value of the first calculation means;

second calculation means for calculating a defocus value for driving the photographic lens in such a manner that an estimated defocus value is calculated on the basis of an amount of the movement of the object during a predetermined time and the estimated defocus value and the lens defocus value in the first calcultion means are added;

focus detecting means for detecting whether the photographic lens is in an in-focus condition by judging whether the defocus value for driving the lens is within a predetermined range, whereby a judgment of the focus condition is made using the result of the second calculation means when the object is moving and the judgment of the focus condition is made using the result of the first calculation means when the object is not moving; and lens driving means for driving the photographic lens on the basis of a result of the defocus values obtained in the first calculation means or second calculation means;

whereby photographing is enabled when an in-focus condition is detected.

25. The automatic focus control device according to claim 24, further comprising display means for displaying an attainment of an in-focus condition.

* * * * *